United States Patent [19]
McKeehan et al.

[11] Patent Number: 6,016,495
[45] Date of Patent: Jan. 18, 2000

[54] OBJECT-ORIENTED FRAMEWORK MECHANISM FOR PROVIDING PERSISTENT STORAGE

[75] Inventors: Michael D. McKeehan; Erik E. Voldal, both of Rochester, Minn.

[73] Assignee: International Business Machines Corporation, Armonk, N.Y.

[21] Appl. No.: 08/934,230

[22] Filed: Sep. 19, 1997

[51] Int. Cl.[7] .................................................... G06F 17/30
[52] U.S. Cl. .......................... 707/103; 707/102; 707/103; 707/104; 395/701
[58] Field of Search ................................... 707/102, 103, 707/104; 395/701

[56] References Cited

U.S. PATENT DOCUMENTS

| | | | |
|---|---|---|---|
| 4,943,932 | 7/1990 | Lark et al. | 364/513 |
| 5,057,996 | 10/1991 | Cutler et al. | 364/200 |
| 5,101,364 | 3/1992 | Davenport et al. | 395/152 |
| 5,119,475 | 6/1992 | Smith et al. | 395/156 |
| 5,181,162 | 1/1993 | Smith et al. | 364/419 |
| 5,195,172 | 3/1993 | Elad et al. | 395/50 |
| 5,226,161 | 7/1993 | Khoyi et al. | 395/650 |
| 5,247,693 | 9/1993 | Bristol | 395/800 |
| 5,249,270 | 9/1993 | Stewart et al. | 395/200 |
| 5,257,384 | 10/1993 | Farrand et al. | 395/725 |
| 5,261,080 | 11/1993 | Khoyi et al. | 395/500 |
| 5,274,572 | 12/1993 | O'Neill et al. | 364/550 |
| 5,276,775 | 1/1994 | Meng | 395/55 |
| 5,287,447 | 2/1994 | Miller et al. | 395/157 |
| 5,293,470 | 3/1994 | Birch et al. | 395/135 |
| 5,297,283 | 3/1994 | Kelly, Jr. et al. | 395/650 |
| 5,315,703 | 5/1994 | Matheny et al. | 395/164 |
| 5,367,633 | 11/1994 | Matheny et al. | 395/164 |
| 5,369,766 | 11/1994 | Nakano et al. | 395/700 |
| 5,379,430 | 1/1995 | Nguyen | 395/700 |
| 5,388,264 | 2/1995 | Tobias, II et al. | 395/650 |
| 5,390,325 | 2/1995 | Miller | 395/575 |
| 5,396,626 | 3/1995 | Nguyen | 395/700 |
| 5,398,336 | 3/1995 | Tantry et al. | 395/600 |
| 5,504,892 | 4/1996 | Atsatt et al. | 707/103 |
| 5,519,862 | 5/1996 | Schaeffer et al. | 395/701 |
| 5,574,915 | 11/1996 | Lemon et al. | 395/561 |
| 5,778,378 | 7/1998 | Rubin | 707/103 |
| 5,787,425 | 7/1998 | Bigus | 707/6 |

OTHER PUBLICATIONS

Text of IBM Technical Disclosure Bulletin, vol. 37, DeBinder et al., Feb. 1994, "Results Folder Framework", pp. 431–432.

Text of IBM Technical Disclosure Bulletin, vol. 36, Coskun, N., Jun. 1993, "Persistent Framework Independent Record/Playback Framework", pp. 261–264.

Text of IBM Technical Disclosure Bulletin, Baker et al., Oct. 1991, "Model View Schema", pp. 321–322.

Text of IBM Technical Disclosure Bulletin, Baker et al., Oct. 1991, "Office Container Class", pp. 309–310.

Text of IBM Technical Disclosure Bulletin, Cavendish et al., Jul. 1991, "Icon Pane Class", pp. 118–119.

Text of IBM Technical Disclosure Bulletin, Baker et al., Jun. 1991, "Distribution List Class", p. 159.

Text of IBM Technical Disclosure Bulletin, Cavendish et al., Jun. 1991, "Object–Oriented Documentation Tool", pp. 50–51.

(List continued on next page.)

*Primary Examiner*—Jack M. Choules
*Assistant Examiner*—Shahid Alam
*Attorney, Agent, or Firm*—Martin & Associates, LLC; Derek P. Martin

[57] ABSTRACT

An object-oriented framework mechanism for persistent storage systems provides an infrastructure that embodies the steps necessary for a framework consumer (i.e., user) to define persistent storage for any type of data not supported in an object-oriented system by extending the framework to fit a particular persistent storage environment. Certain core functions are provided by the framework, which interact with extensible functions. A user may thus define extensible functions that allow the framework to support many different types of persistent data stored in datastores capable of storing the persistent data.

55 Claims, 24 Drawing Sheets

OTHER PUBLICATIONS

Text of IBM Technical Disclosure Bulletin, Allard et al., Feb. 1990, "Object–Oriented Programming in C—the Linnaeus System", pp. 437–439.

Text of IBM Technical Disclosure Bulletin, vol. 38, No. 1, Jan. 1995, pp. 411–414, J. Knapman, "Gnerating Specific Server Programs in Distributed Object–Oriented Customer Information Control System".

Text of IBM Technical Disclosure Bulletin, vol. 37, No. 12, Dec. 1994, pp. 19–20, Al–Karmi et al., k"Events Set for Event Tracing in Distributed Object–Oriented Systems".

Text of IBM Technical Disclosure Bulletin, vol. 37, No. 12, Dec. 1994, pp. 375–378, Acker et al., "Automatically Generating Formatted Documentation for Object–Oriented Class Libraries".

Text of IBM Technical Disclosure Bulletin, vol. 37, No. 11, Nov. 1994, pp. 71–72, Behrs et al., "Device Support Framework to Support ISO DPA 10175 and POSIX 1387.4".

Text of IBM Technical Disclosure Bulletin, vol. 37, No. 7, Jul. 1994, pp. 145–146, Banda et al., "Exception Management Algorithm for Multi–Threaded Method Invocation".

Text of IBM Technical Disclosure Bulletin, vol. 37, No. 6B, Jun. 1994, pp. 553–556, Gest et al., "Portable Object–Oriented Event Manager".

Abstract for WIPO Patent Application No. WO 95/04966, F. T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentation with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Applications Processing Appartus".

Abstract from WIPO Patent Application No. WO9422081, Sep. 29, 1994, "Hardware–Independent Interface for Interrupt Processing", G. O. Norman et al.

Abstract for WIPO Patent Application No. 94/19752, Anderson et al., Sep. 1, 1994, "Concurrent Framework Processing Appartus for Two or More Users".

Abstract for WIPO Patent Application No. 94/19751, Anderson et al., Sep. 1, 1994, "Concurrent Framework Processing Appartus for Application Users".

Abstract for WIPO Patent Application No. 94/19740, Goldsmith et al., Sep. 1, 1994, "Framework Processor of Object–Oriented Application".

Abstract from WIPO Patent Application No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. 9415282, Jul. 7, 1994, "Object–Oriented Notification Framework System", D. R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partioning for Computer Applications in Object Oriented System".

Abstract for WIPO Patent Application No. 95/01610, Koko et al., Jam. 12, 1995, "Object Oriented Product Structure Management in Computer–Aided Product Design".

Abstract fpr WIPO Patent Application No. 95/04967, Feb. 16, 1992, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Application No. EP 622730, "Encapsulation of Extracted Portions of Documents Into Objects", M. A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–to–End Simulation of A Surveillance System Employing Architecture Independence, Variable Fidelity Components and Software Resue".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With Constraint-–Based Representation of Time–Tables".

Inspec Abstract No. C9501–6140D–005, S. Vinoski, 1994, "Mapping CORBA IDL Into C++".

Inspec Abstract No. C9501–7330–007, Salminen et al., 1994, "Modelling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Oingzhong et al., 1992, "An Object–Oriented Model for Intelligent Networks".

Inspec Abstract No. C9412–7810–003, from Jung et al., 1993, "Development of an Object–Orientd Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented CASE Tool".

Inspec Abstract No. C9411–7100–029, from C. Le Pape, 1994, "Implementation of Resource Constraints is ILOG SCHEDULE: A Library for the Development of Constraint–Based Scheduling Systems".

Inspec Abstract No. C9410–6180G–015, from Eichelberg et al., 1993, "Integrating Interactive 3d–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Studye of Using Reusable Software Design Frameworks to Achieve Software Reuse".

Inspec Abstract No. C9408–7420–021, from Pirklbauer et al., 1994, "Object–Oriented Process Control Software".

Inspec Abstract No. C9408–6110J–011, from Gyu–Chung et al., 1993, "System Methodologies of Object–Oriented Programs".

Inspec Abstract No. C9407–7420D–045, from Desai et al., "Controller Structure Definition Via Intelligent Process Control".

Inspec Abstract No. C9407–6140D–014, from Satoh et al., 1994, "Semantics for a Real–Time Object–Oriented Programming Language".

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework for Quencing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186, from Righter et al., 1994, "An Object–Oriented Characterization of Spatial Ecosystem Information".

Inspec Abstract No. C9412–6160J–025 from J. Livari, 1994, "Object–Oriented Information System Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–view Editing Environments Using MViews".

Inspec Abstract No. 4664213, "Maintaining Information about Persistent Replicated Objects in a Distributed System", 1993 IEEE Conference on Distributed Computing Sytems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–007, from J. D. Grimes, 1993, "Objects 101–An Implementation View", Proceedings of COMPCON, 1994.

Inspec Abstract No. 4647921, from Uhorchak et al., 1993, "An Object–Oriented Class Library for Creating Engineering Graphs Using PHIGS".

Inspec Abstract No. 4642214, from Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object–Oriented System".

Inspec Abstract No. 4618974, from Bowers, 1993, "Some Principles for the Encapsulation of the Behaviour of Aggregate Objects".

Inspec Abstract No. 461931, from Islan et al., 1993, "Uniform Co–Scheduling Using Object–Oriented Design Techniques".

Inspec Abstract No. 4613481, from Thiene et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Enviroment for Designing Object–Oriented Enterprise Models".

Inspec Abstract No. 4593721, Periyasamy et al., 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembench: Redesign of a Large Commerical Application Using Object–Oriented Techniques".

Inspec Abstract No. 4566447, from J. Rossazza, 1992, "An Object–Centered Fuzzy Representation".

Inspec Abstract No. 4565630, form Karpovich et al., 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The Ecology of Class Refinement".

Inspec Abstract No. 4534334, from Campbell et al., 1991, "A Technique for Documenting the Framework of an Object–Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in LOGIDATA+".

Inspec Abstract No. 4525743, from Hakinzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Type and Classes in Open Distributed Processing", 1993.

Inspec Abstract No. 4459325, from Kesin et al., 1992, "On the Evolution of Objects in a Logic Programming Framework".

Inspec Abstract No. 447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kariem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Managment in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechansim for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM within an Object–Oriented Framework".

Inspec Abstract No. 4275707, from Tsukamoto et al., 1991, "DOT: A Term Representation Using DOT Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abstract No. 4152687, from M. Wolczko, 1992, "Encapsulation: Delegation and Inheritance in Object–Oriented Languages".

Inspec Abstract No. 4117514, from Wuwongse et al., 1991, "An Object–Oriented Approach to Model Management".

Inspec Abstract No. C94204–6110J–017, "Choices, Frameworks and Refinement", R. H. Campbell et al., 1991.

Inspec Abstract No. 4090970, from P. Kougiouris, 1991, "Device Management Framework for an Object–Oriented Operating System".

Inspec Abstract No. 4077440, from A Mahler, 1991, "Organizing Tools in a Uniform Environment Framework".

Inspec Abstract No. 4067033, from Shaw et al., 1990, "Experience with the ET++Application Framework".

Inspec Abstract No. 4060084, from Muller et al., 1990, "ODICE: Object–Oriented Hardware Description in CAD Environment".

Inspec Abstract No. 4050569, from Di Giovanni et al., 1990, "HOOD Nets".

Inspec Abstract No. C91072815, from Holtkamp et al., 1990, "DEMON–A Desciption Based Media Object Data Model".

Inspec Abstract No. C91072016, from A. Lane, 1991, "/DOSC/C++–Application Frameworks".

Inspec Abstract No. C91072574, from Hemery et al., "An Analysis of Communication and Multiprogramming in the Helios Operating System".

Inspec Abstract No. C91064787, from Madany et al., 1989, "A Class Hierarchy for Building Stream–Oriented File Systems".

Inspec Abstract No. C91064580, from Gamma et al., 1989, "Integration of a Programming Environment into ET++–A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object–Oriented".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApps: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C890062837, from Pasquier–Boltuck et al., 1988, "Prototyping an Interactive Electronic Book System Using an Object–Oriented Approach".

Inspec Abstract No. C890056727, from Campbell et al., 1989, "Principles of Object–Oriented Operating System Design".

Inspec Abstract No. C89056859, from Hull et al., 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1988, "A Framework for Multiple, Concurrent Graphical Representation".

Inspec Abstract No. C89033226, from Corradi et al., 1988, "PO: An Object Model to Epxress Parallelism".

Inspec Abstract No. C89014870, from R. King, 1988, "Semantic and Object–Oriented Database Support for Software Environments".

Inspec Abstract No. 89003142, from Tenma et al., 1986, "A System for Generating Language–Oriented Editors".

Inspec Abstract No. C88013915, from Woekl et al., 1987, "Multimedia Information Managment in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga, 1985; "PROMPTER: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

Zoo Administrator
(from Zoo Administration)

5_minute_timer()
add/delete_animal()
add/delete_containment_unit()
add/delete_zoo_keeper()
start_zoo_admin()

Containment Unit
(from Containment
Unit Mechanism)
adjust_temp()

FIG. 6

OBJECT-ORIENTED FRAMEWORK MECHANISM FOR PROVIDING PERSISTENT STORAGE

FIELD OF THE INVENTION

The present invention relates in general to the data processing field. More specifically, the present invention relates to the field of object-oriented framework mechanisms.

BACKGROUND OF THE INVENTION

The development of the EDVAC computer system of 1948 is often cited as the beginning of the computer era. Since that time computers have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Computer networks are capable of performing jobs that no single computer could perform and they allow low cost personal computer systems to connect to larger systems to perform tasks that such low cost systems could not perform alone. In order for computer systems to cooperate in a network to perform some complex job, software must be developed which efficiently delegates parts of the chore or tasks to different computers in the network. One of the recent advances in the field of software development has been the emergence of object-oriented programming technology.

The goal of using object-oriented programming is to create small, reusable sections of program code known as objects that can be quickly and easily combined and re-used to create new programs. This is similar to the idea of using the same set of building blocks again and again to create many different structures. The modular and re-usable aspects of objects typically speeds development of new programs, thereby reducing the costs associated with the development cycle. In addition, by creating and re-using a group of well-tested objects, a more stable, uniform, and consistent approach to developing new computer programs can be achieved.

Although object-oriented programming offers significant improvements over other programming types, program development still requires significant amounts of time and effort, especially if no preexisting objects are available as a starting point. Consequently, one approach has been to provide a program developer with a set of pre-defined, interconnected classes that create a set of objects. Such pre-defined classes and libraries are typically called object frameworks. Frameworks essentially provide a prefabricated structure for a working program by defining certain classes, class relationships, and methods that a programmer may easily use by appropriate subclassing to generate a new object-oriented program.

An object in an object-oriented computer program typically has attributes defined by state data that determine how the object will behave. If an object is transient, it is created within a process, and terminates when the process ends. If an object is persistent, however, mechanisms are put in place to allow the object to survive the process that creates it so it can be accessed by other processes. A distributed object system results when an object in one process is allowed to access an object in another process. A distributed object environment, as used herein, means any hardware and software configuration and/or combination that allows an object in a first process to access an object in a second process. Examples of known distributed object systems include: 1) a first process and a second process residing on the same computer; 2) a first process and a second processes residing on different computer workstations in a local area network (LAN); and 3) a first process and a second process residing on computers in geographically remote locations that are interconnected using a wide area network (WAN). As technology progresses, other distributed object systems will, no doubt, be developed, and the present invention expressly encompasses all types of distributed object systems, whether now known or developed in the future.

Objects are typically made persistent by storing their state data in a local data store. In many known computer systems, the process of making an object persistent is known as "externalization". Externalization is the means or protocol used in object-oriented programming for transferring data out of an object. In essence the "state data" that defines the attributes of an object are "externalized", or written out of the object, into a different format that is easily stored in the local data store. When the object is needed again, the externalized state data is internalized into an object, creating an exact copy of the object as it previously existed.

Objects that are located on different computer systems may have different attributes that allow the object to be stored in the local data store. For example, one computer system may store data in a flat file (such as a POSIX file) in a standard directory structure, and objects on this computer system will be configured to store their state data in the appropriate file format. A different computer system may store data in a relational data base (RDB), and objects on this computer system will be configured to store their state data in the RDB format.

Known persistent storage systems limit the types of data that can be stored persistently. For example, a particular persistent storage system may only support RDB or POSIX formats. Consequently, users may have access to data that cannot be stored persistently simply because the persistent storage system in use does not support storing data of that particular format. This problem becomes more acute as more computer systems with different persistent storage systems become interconnected in a distributed object environment.

As the need for persistent storage of wide varieties of data formats grows, the need for better mechanisms for storing persistent data becomes more apparent. Without a mechanism that can be readily customized and extended to provide new persistent storage systems, the computer industry will never fully realize the potential and power of sharing data in distributed object systems.

SUMMARY OF THE INVENTION

As discussed in the Background section, there is a serious need in the industry for user-extensible persistent storage systems. According to the present invention, an object-oriented framework mechanism for persistent storage environments systems provides an infrastructure that embodies the steps necessary for a framework consumer (ie., user) to define persistent storage for any type of data not supported in the persistent storage system by extending the framework to fit a particular persistent storage environment. Certain core functions are provided by the framework, which interact with extensible functions. A user may thus define extensible functions that allow the framework to support many different types of persistent data stored in datastores capable of storing the persistent data.

The framework mechanism of the present invention was designed and constructed using object-oriented technology. Those who are unfamiliar with object-oriented technology, or with object-oriented framework mechanisms, should read the object-oriented overview section of the Description of the Preferred Embodiments section.

BRIEF DESCRIPTION OF THE DRAWINGS

FIGS. 2 through 6 are class diagrams for the example framework mechanism of FIG. 1;

DESCRIPTION OF THE PREFERRED EMBODIMENTS

Overview—Object-Oriented Technology

Figure 1:
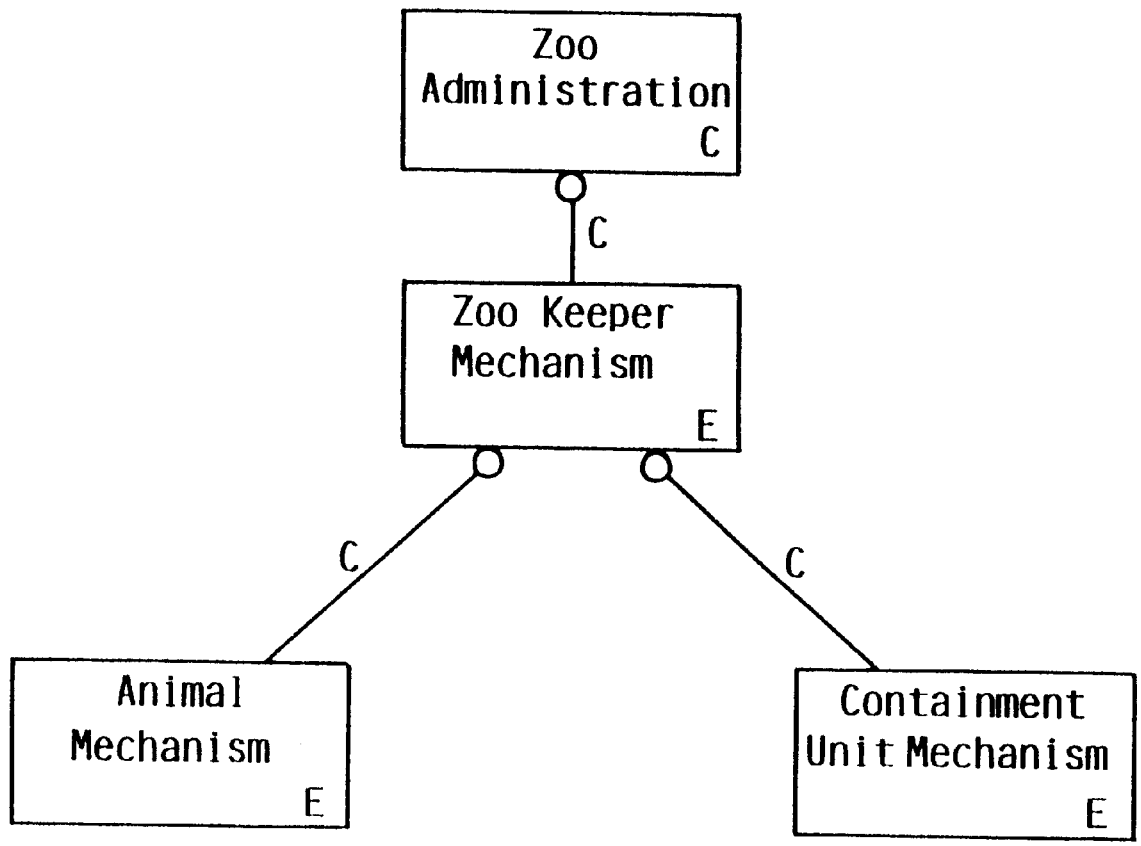
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (ie., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers or users) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages 22–27). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2A:
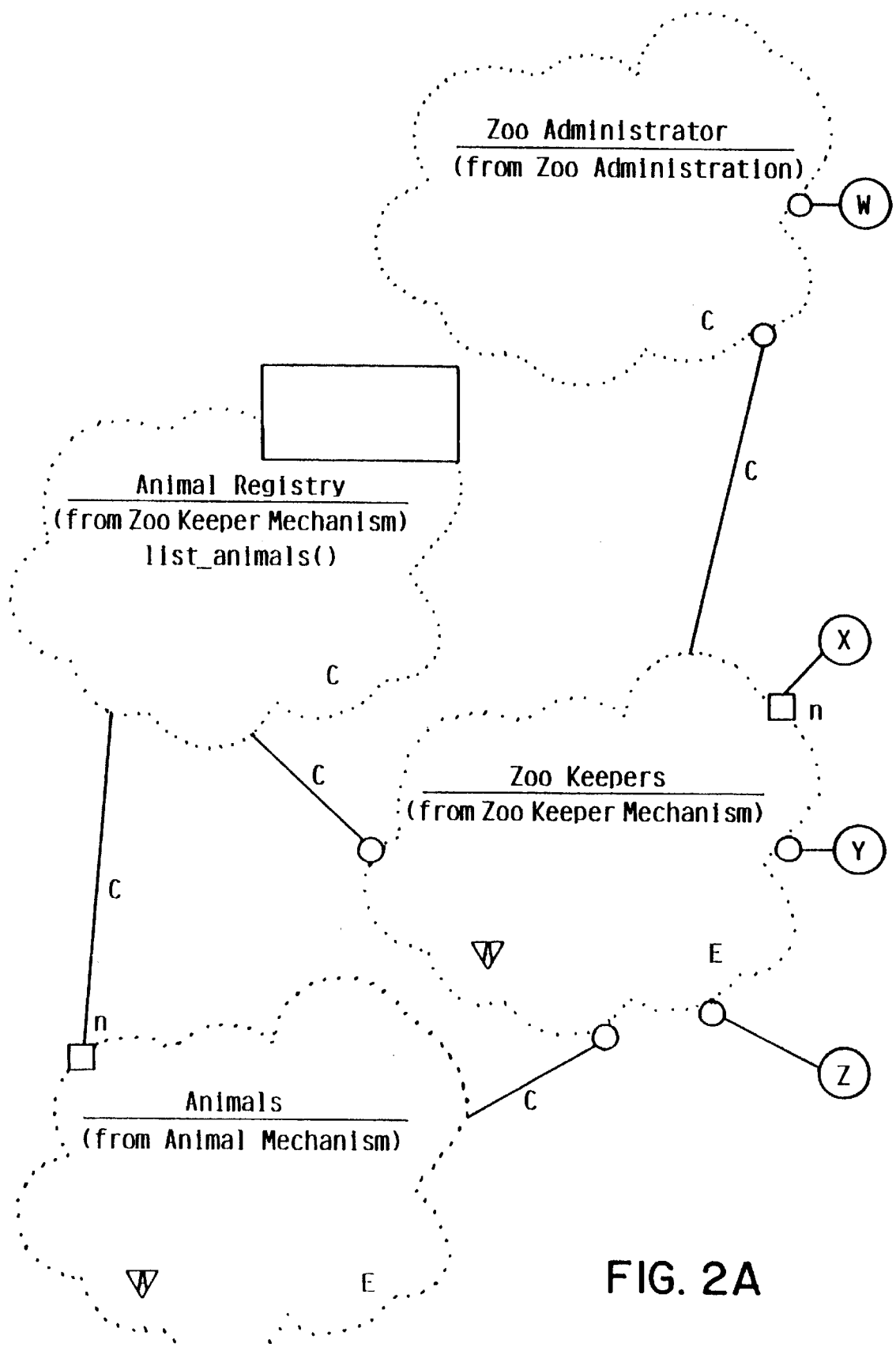
Figure 2B:
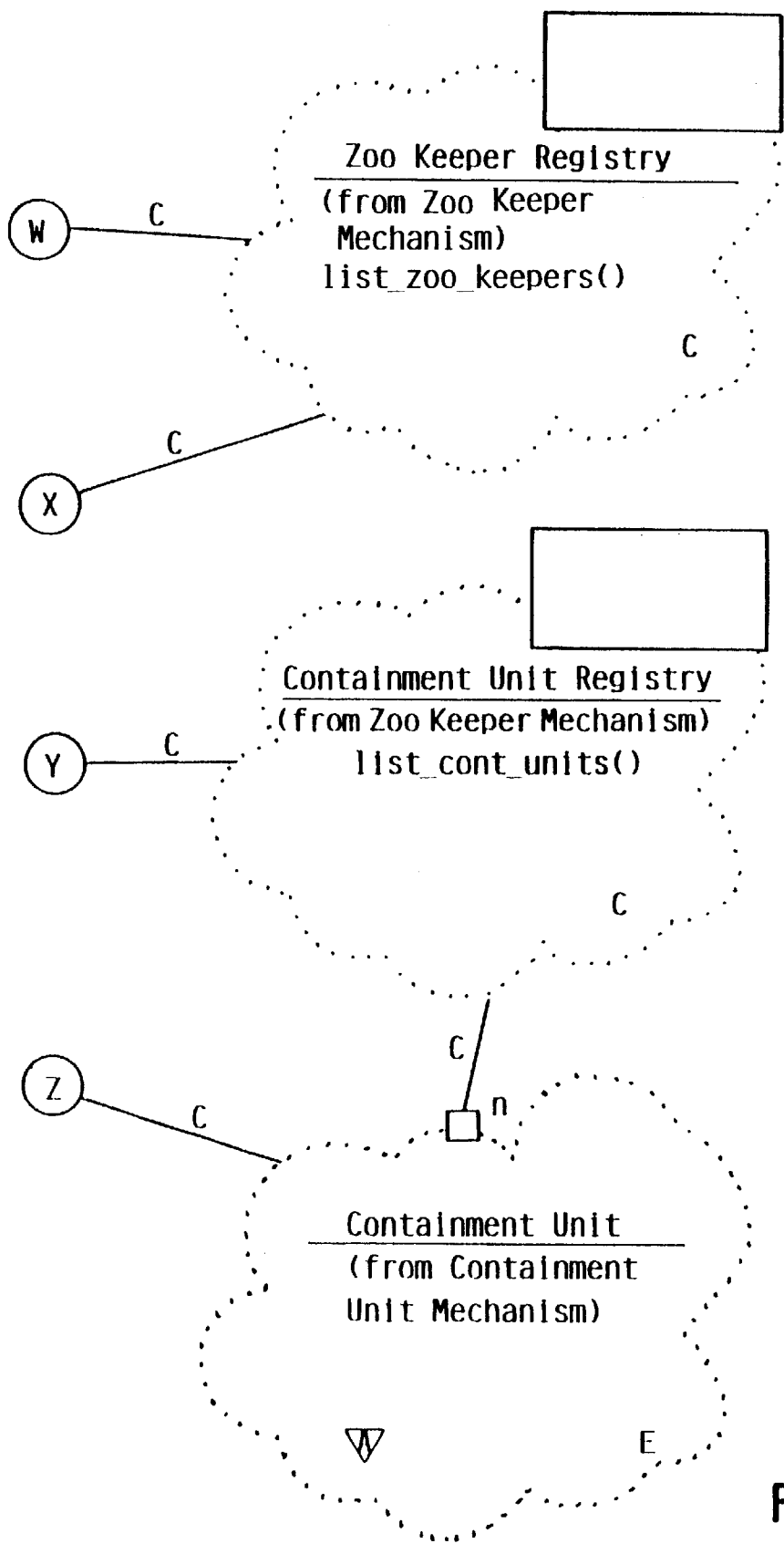

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administrator class has been designed to have a uses relationship with the zoo keeper registry. Our framework designer has designed the zoo administrator and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers() operation. As will be described later, this operation is responsible for providing a list of zoo keeper objects to other objects that request such a list.

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: 5_minute_timer(), add_animal(), add_containment_unit(), add_zoo_keeper(), and start_zoo_admin().

The start_zoo_admin() operation is responsible for starting ZAF. That is, a user or system administrator will interact with the start_zoo_admin() operation to begin administration of a zoo via ZAF. Once started, our framework designer has designed the start_zoo_admin() operation to initiate the 5_minute_timer() operation. Every five minutes, the 5_minute_timer() operation instructs the zoo keeper objects to go out and check on the animals. The add/delete_zoo_keeper operation is responsible for interacting with users of ZAF to define additional zoo keepers (ie., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal() operation is responsible for interacting with users to define additional zoo animal classes and objects and to remove classes and objects that are no longer needed. Again, it is quite natural for a zoo to need to add and remove animals. The add/delete_containment_unit() operation is responsible for the definition of new containment unit classes and objects and for removal of classes and/or objects that are no longer necessary. Again, our framework designer has designed ZAF in a way that provides this flexibility by designing the animal and containment unit mechanisms as extensible functions.

Referring back to FIG. 2, the zoo keepers class definition has a uses relationship with the animal registry, animals, containment unit registry, and containment units classes. Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core ftnctions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (ie., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
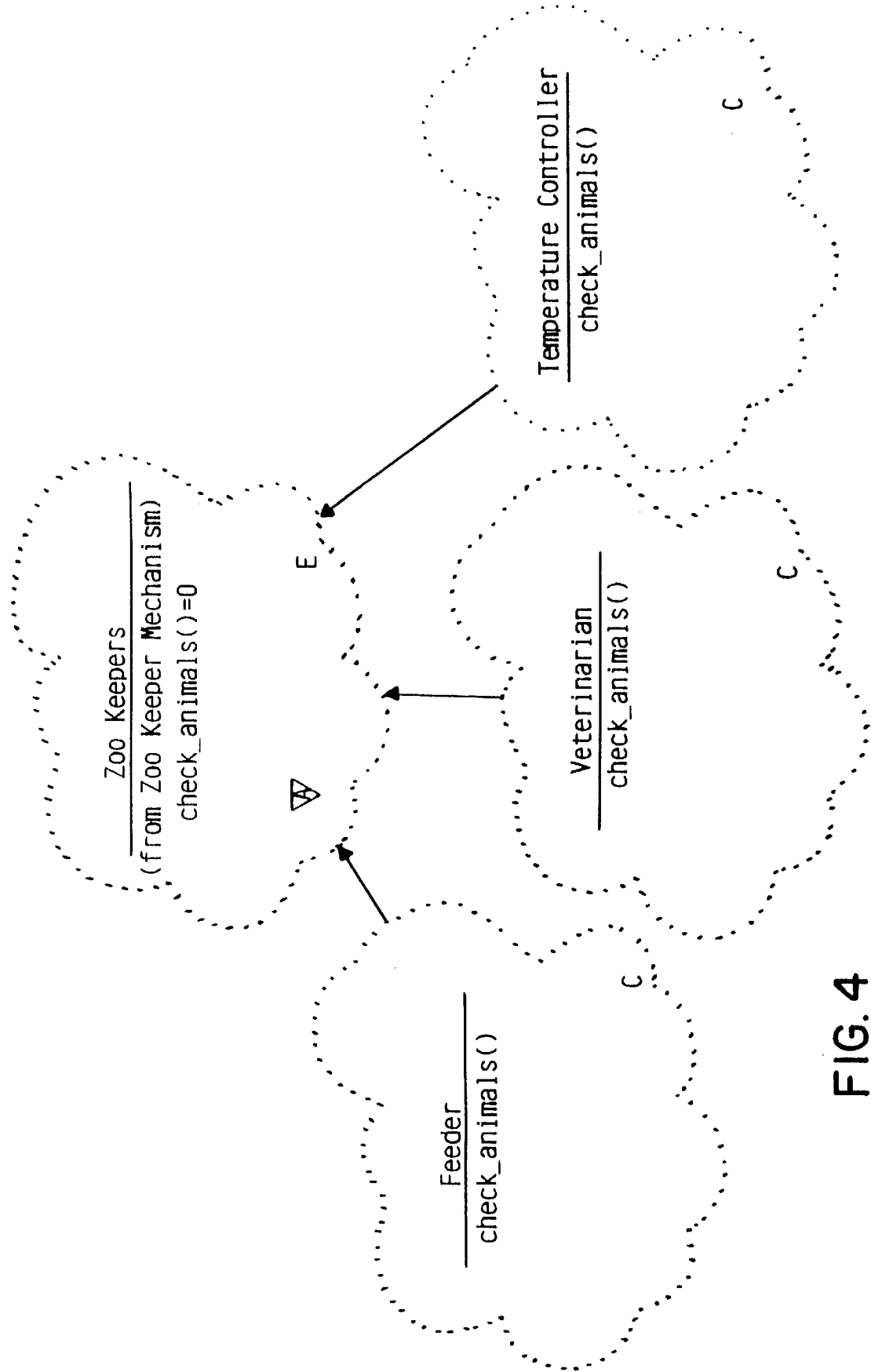

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals() operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_ animals() operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals() operation, the zoo administrator object need not have special knowledge about the subclasses of any of the server objects. This has the effect of decoupling the need for the action (ie., on the part of the zoo administrator object) from the way in which the action is carried out (i e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
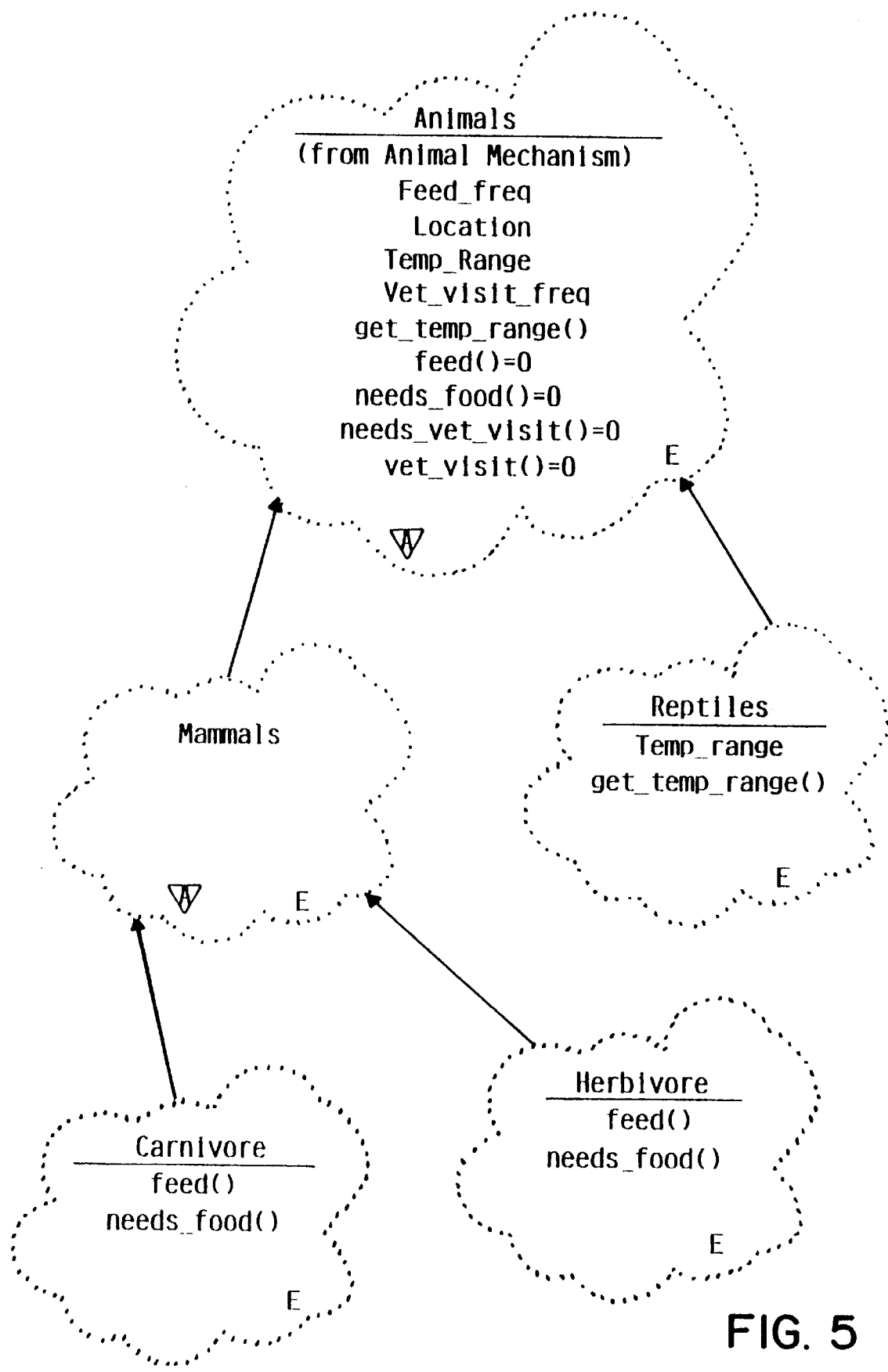

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and operation definitions get_temp_range(), feed(), needs_food(), needs_vet_visit(), and vet_visit().

For the purposes of this framework overview, it is not necessary to explore each definition in detail. However, the temp_range data definition and the get_temp_range() and feed() operation definitions are good examples of well thought out framework design choices.

The feed() operation definition is designed to perform the actual feeding of the animals (i.e., through specific feeding apparatus which is not shown). The feed() operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed() operation difficult, but valueless.

By way of comparison, the framework designer has explicitly designed the get_temp_range() operation such that it is not a pure virtual operation definition. This means that get_temp_range() has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed() operation has been left up to the subclasses, subclasses carnivore and herbivore each have their own definition of the feed() operation. Again, this is a good design choice because meat eating carnivores are going to have different needs than their plant eating counterparts.

Temp_range is a data definition for the range of temperatures that coincides with that of the specific animal's natural habitat and the get_temp_range() operation definition is designed to retrieve the temp_range for a specific animal and return it to a requesting client object. Subclass reptiles contains its own data definition for temp_range and its own definition for the get_temp_range() operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

FIG. 6 is a class diagram showing a lower level view of the containment unit class. The containment unit class contains virtual operation definition adjust_temp(). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7A:
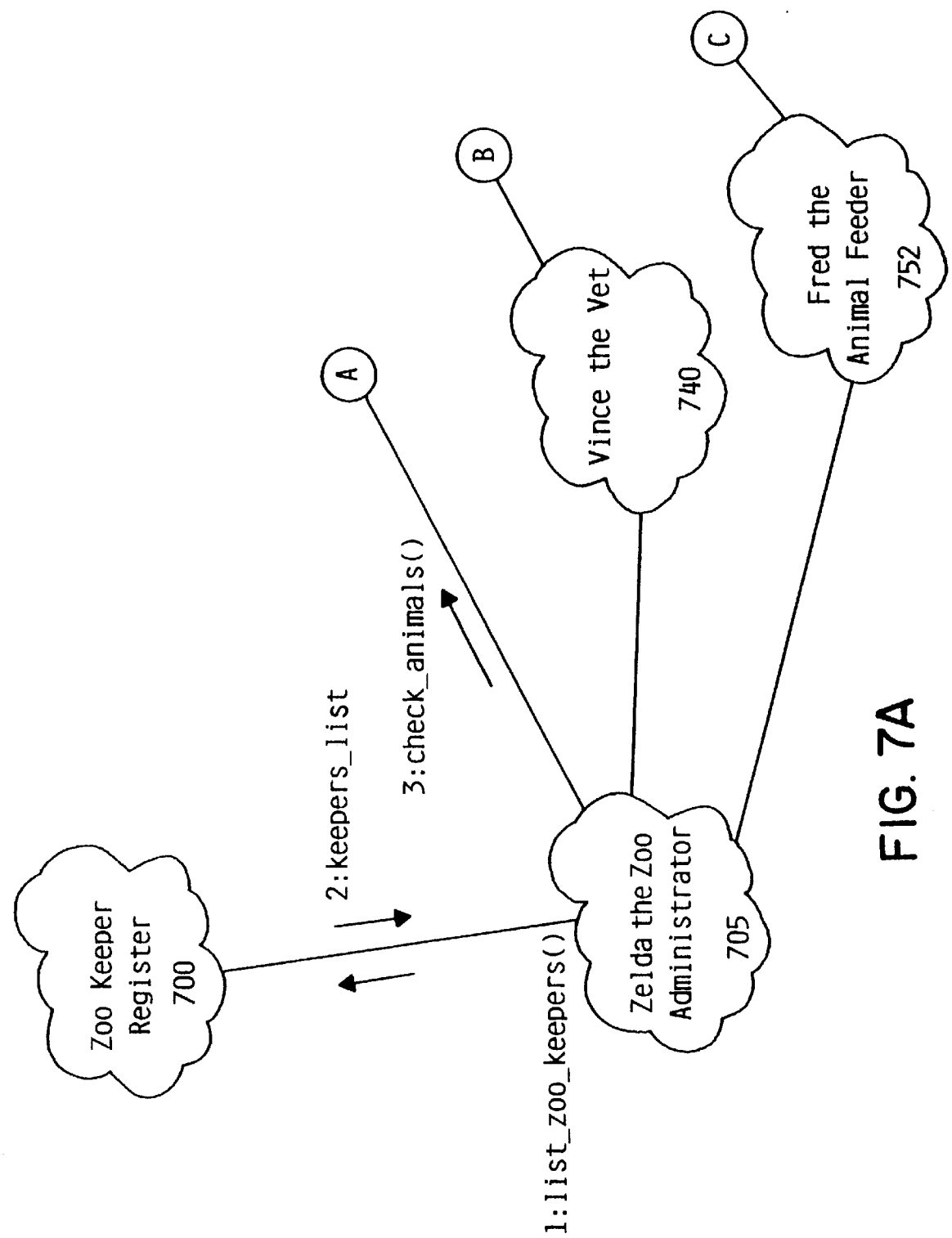
FIG. 7 is an object diagram for the example framework mechanism of FIGS. 1 through 6.
Figure 7B:
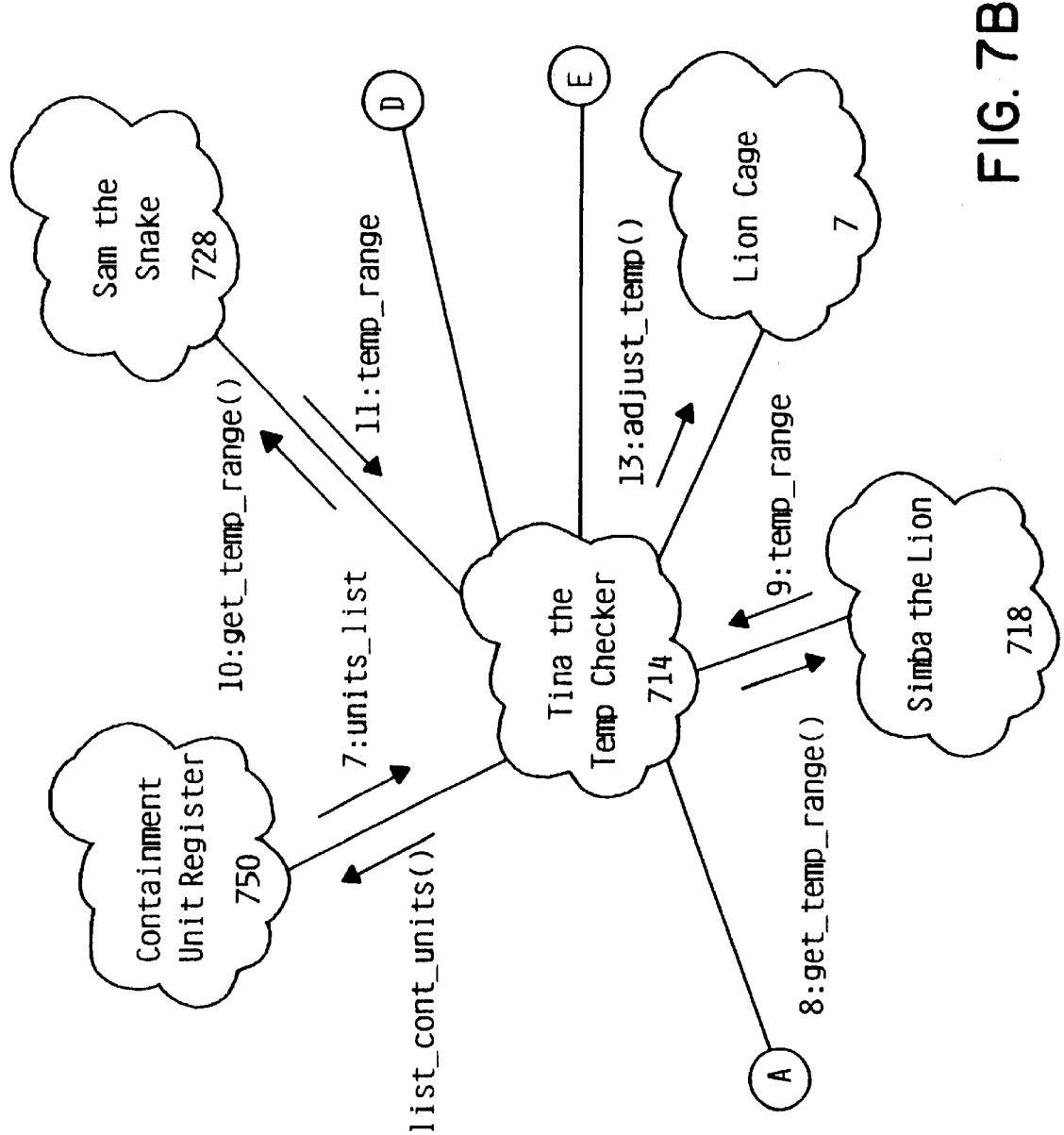
Figure 7C:
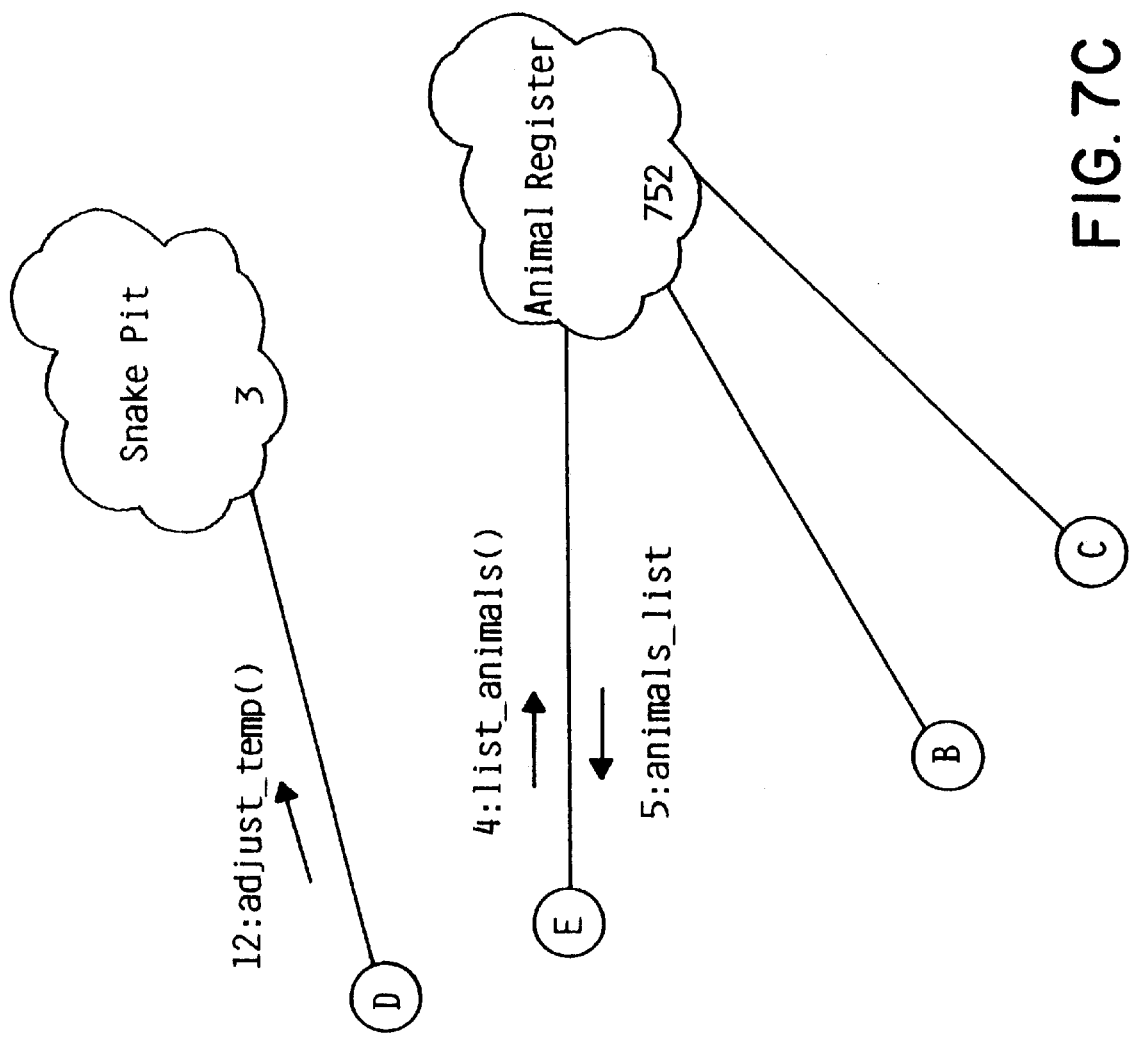

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers() operation [step 1] of the Zoo Keeper Register object. The Zoo Keeper Register object has been created as a member of the zoo keeper register class. For the purposes of illustration, assume that this occurs every five minutes as part of Zelda's 5_minute_timer() operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check animals() operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals() operation) to communicate with each zoo keeper object. It is then up to the individual zoo keeper objects to perform the task for which they have been created. Each zoo keeper object performs its assigned task through use of its own check_animals() operation. For example, object Tina's check_animals() operation retrieves a list of current animals from the animal registry object by calling the list_animals() operation [step 4] and then a list of containment units from the containment unit register object by calling the list_cont_units() operation [step 6]. Upon examining the animal list, object Tina's check_animals() operation determines that there are only two animals currently registered in the zoo, Sam the Snake [object 728] and Simba the Lion [object 718].

Object Tina's check_animals() operation then calls the get temp_range() operations to get temperature ranges from objects Sam and Simba [steps 8 and 10]. Once the temperature ranges have been returned, the check_animals() operation of object Tina determines which containment units house the respective animals (ie., Simba and Sam) and then calls the adjust_temp() operation of the appropriate containment unit (i e., Lion Cage 7 in the case of object Simba and Snake Pit 3 in the case of object Sam) to adjust the temperature of the containment units [steps 12 and 13].

The adjust_temp() operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals() operation and the adjust temp() operations is polymorphic. In other words, the check_animals() operation of object Tina does not require specialized knowledge about how each adjust_temp() operation performs its task. The check_animals() operation merely had to abide by the interface and call the adjust_temp() operations. After that, it is up to the individual adjust_temp() operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the following Detailed Description.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer()", "add_animal()", and "add_containment_unit()". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a fiend class is denoted by an upper case block "F" within an adornment triangle, and a virtual class is represented by an upper case block "V" within an adornment triangle.

In addition to defining classes, a designer of an object-oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object-oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams convey the same information from that conveyed by object diagrams, but simply present the same information in a different format. The present specification makes use of object diagrams for the ZAF example and for the description of the invention, and those skilled in the art will recognize that interaction diagrams are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

DETAILED DESCRIPTION

Figure 8:
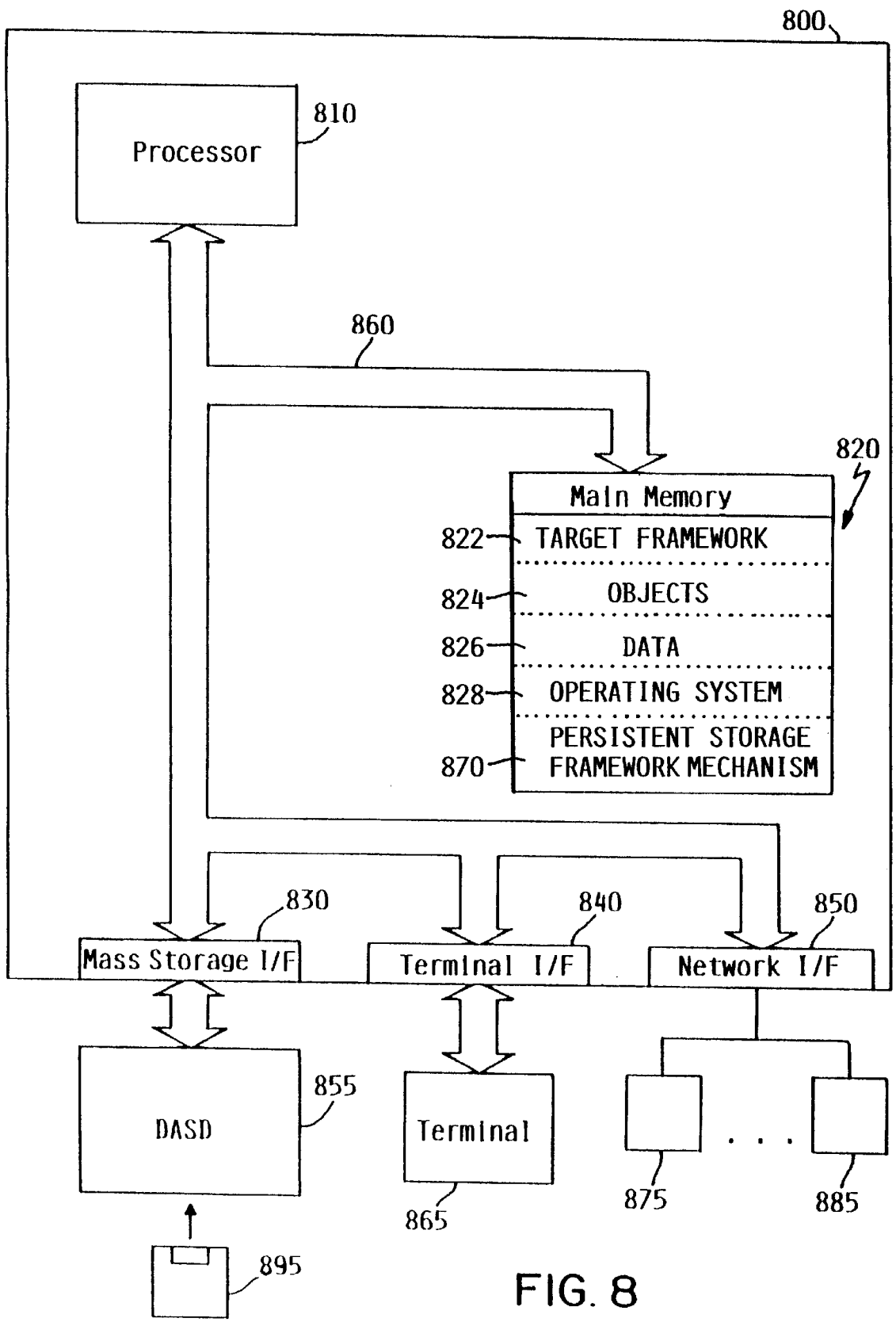
FIG. 8 is a block diagram of the computer system used in the preferred embodiment.

FIG. 8 shows a block diagram of a computer system 800 in accordance with the present invention. The computer system of the preferred embodiment is a computer system such as an AIX platform. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 8, computer system 800 comprises main or central processing unit (CPU) 810 connected to main memory 820, mass storage interface 830, terminal interface 840, and network interface 850. These system components are interconnected through the use of a system bus 860. Mass storage interface 830 is used to connect mass storage devices (such as DASD device 855) to computer system 800. One specific type of DASD device is a floppy disk drive, which may store data to and read data from a floppy diskette 895.

Main memory 820 contains application programs 822, objects 824, data 826, and an operating system 828. Computer system 800 utilizes well known virtual addressing mechanisms that allow the programs of computer system 800 to behave as if they only have access to a large, single storage entity (referred to herein as computer system memory) instead of access to multiple, smaller storage entities such as main memory 820 and DASD device 855. Therefore, while application programs 822, objects 824, and operating system 828 are shown to reside in main memory 820, those skilled in the art will recognize that these programs are not necessarily all completely contained in main memory 820 at the same time. Note that the term "memory" is used herein to generically refer to the entire virtual memory of computer system 800.

Operating system 828 is a suitable multitasking operating system such as AIX; however, those skilled in the art will appreciate that the spirit and scope of the present invention is not limited to any one operating system. Operating system 828 preferably supports an object-oriented programming environment such as that provided, for example, by the C++ programming language. One or more application programs 822 provide a programming environment for computer system 800, and include a persistent storage framework mechanism 870, which is preferably an object-oriented framework mechanism. Framework mechanism 870 contains instructions capable of being executed on CPU 810 and may exist anywhere in the virtual memory space of computer 800.

Although computer system 800 is shown to contain only a single main CPU and a single system bus, those skilled in the art will appreciate that the present invention may be practiced using a computer system that has multiple CPUs and/or multiple buses, whether contained in a single unit or distributed across a distributed processing computer system. In addition, the interfaces that are used in the preferred embodiment each include separate, fully programmed microprocessors that are used to off-load compute-intensive processing from CPU 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent or fully programmable workstations, are used to allow system administrators and users to communicate with computer system 800.

Network interface 850 is used to connect other computer systems and/or workstations (e.g., 875 and 885 in FIC. 8) to computer system 800 in networked fashion. The present invention applies equally no matter how computer system 800 may be connected to other computer systems and/or workstations, regardless of whether the connection to the network is made using present-day analog and/or digital techniques or via some networking mechanism of the future. It is also important to point out that the presence of network interface 850 within computer system 800 means that computer system 800 may engage in cooperative processing with one or more other computer systems or workstations. Of course, this in turn means that the programs shown in main memory 820 need not necessarily all reside on computer system 800. For example, one or more application programs 822 may reside on another system and engage in cooperative processing with one or more programs that reside on computer system 800. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disk (e.g., 895 of FIG. 8) and CD ROMs, and transmission type media such as digital and analog communication links.

Persistent Storage Framework Mechanism of the Present Invention

The persistent storage framework mechanism disclosed herein provides an architecture for providing different persistent storage systems on a computer system. Extending the framework to accommodate a specific type of persistent storage system defines a "persistent storage environment." For example, extending the framework to define an ODBC persistent datastore for objects creates a persistent storage environment that is tailored to the storage requirements of an ODBC system.

By providing framework mechanism 870 within computer system 800 to define persistent storage systems, a uniform interface for all persistent storage systems may be developed. Framework mechanism 870 may replace all of the proprietary persistent storage systems that are currently incompatible in modern distributed object environments. This would allow a common user interface for defining virtually any type of persistent storage system. This common user interface would greatly ease the burden of programming and maintaining persistent storage systems. Thus, one of the primary benefits of the framework disclosed herein is the capability to define new persistent storage systems using a simple, easy to use user interface defined by the framework.

Figure 9:
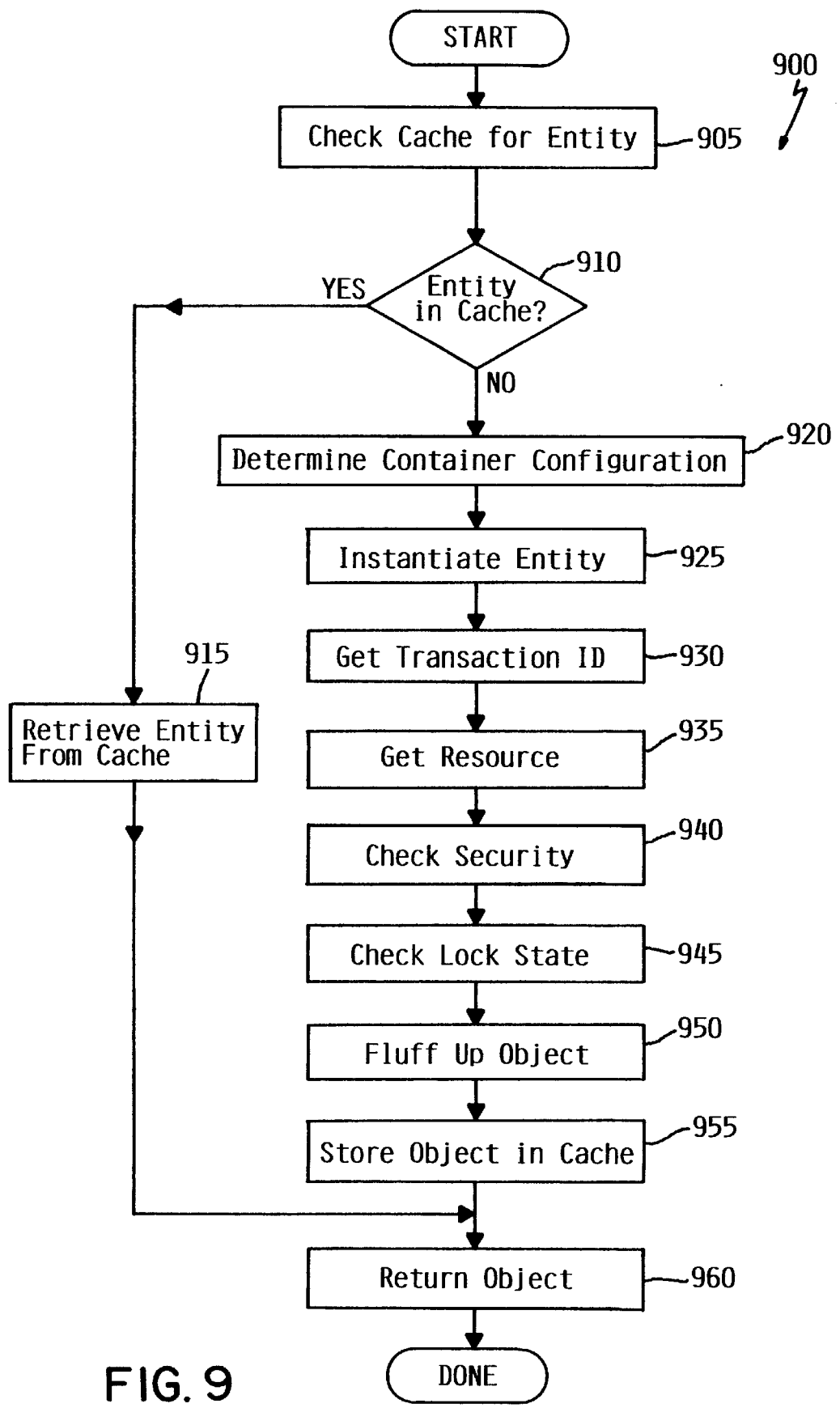
FIG. 9 is a flow diagram showing steps in accordance with the preferred embodiment to perform core functions of the framework mechanism.

Referring to FIG. 9, an example of persistent storage framework 870 in accordance with the preferred embodiment performs steps that comprise a method 900 for handling requests to access persistent objects. For the purpose of illustrating the core functions of framework 870, method 900 is directed to a specific method getEntity() that is defined by PersistentContainer. When getEntity() is called, the parameters Handle and AccessMode are passed with the call. The Handle parameter identifies the entity, and the AccessMode parameter specifies how to access the entity. For a getEntity() method, the first step is to check the cache to determine whether the requested entity is in the cache (step 905). If the entity is in the cache (step 910=YES), the entity is retrieved from cache (step 915), and the entity (i.e., object) is returned (step 960). If, however, the entity is not in the cache (step 910=NO), the container configuration must be determined (step 920). Next, an empty object for the requested entity is instantiated (step 925). A transaction ID is then determined for the transaction (step 930), along with the applicable resource (step 935). Next, the security of the entity is checked (step 940) to assure the caller object may access the entity, and the lock state is checked (step 945) to both assure the object is not already locked and to lock the object through the end of the transaction. Next, the object is fluffed up (step 950), stored in cache (step 955), and returned to the caller (step 960).

The manner of fluffing up the object (step 950) depends on the type of persistent container that is defined, and the extensible portions of framework 870 determine how the fluffing up is performed. A method doGetEntity() is defined in the PersistentContainer class (see FIG. 16) that delegates a portion of the getEntity() function to the extensible portions that define a particular persistent storage environment. This delegation will be discussed in more detail below in the description of the ODBC system defined in FIG. 16. In short, the doGetEntity() method retrieves state data from the persistent container and uses the state data to create the desired object.

Note that a particular persistent storage environment may not use some of the steps in method 900. These steps are defined by the framework, and allow a user of the framework to pick and choose the specific steps and their order needed to provide a variety of different persistent storage environments. Note also that while the core function of framework 870 is described with reference to FIG. 9 for the getEntity() method, one skilled in the art will recognize that other methods, such as createEntity() or deleteEntity(), will perform similar steps with minor variations to accomplish the desired function.

The fact that the preferred embodiment of the framework is object-oriented allows the user of the framework to easily define the needed functions by subclassing from the classes defined within the framework using known object-oriented programming environments, such as C++. The preferred embodiment of the present invention is an object-oriented persistent storage framework. While many different designs and implementations are possible, one suitable example of an object-oriented persistent storage framework is disclosed below to illustrate the broad concepts of the present invention.

Class Definitions

Figure 10:
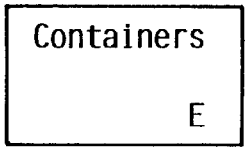
FIG. 10 is a category diagram of a framework mechanism constructed in accordance with the teachings of the preferred embodiment.

FIG. 10 is a category diagram of the persistent storage framework mechanism 870 in accordance with the preferred embodiment. Only a single category Containers is defined that represents a collection of object-oriented programming (OOP) classes that encapsulate data attributes and behaviors (or methods). Objects instantiated as members of these classes are stored in the main memory 820 of computer system 800. All classes shown in FIGS. 11–16 are members of the Container category. The container category is an extensible category (as indicated by the "E" label), meaning that users may extend many of the classes in this category by defining and implementing classes that are subclasses of framework-defined classes. These classes may be implemented, for example, in a computer system operating environment that supports the C++ programming language.

Figure 11A:
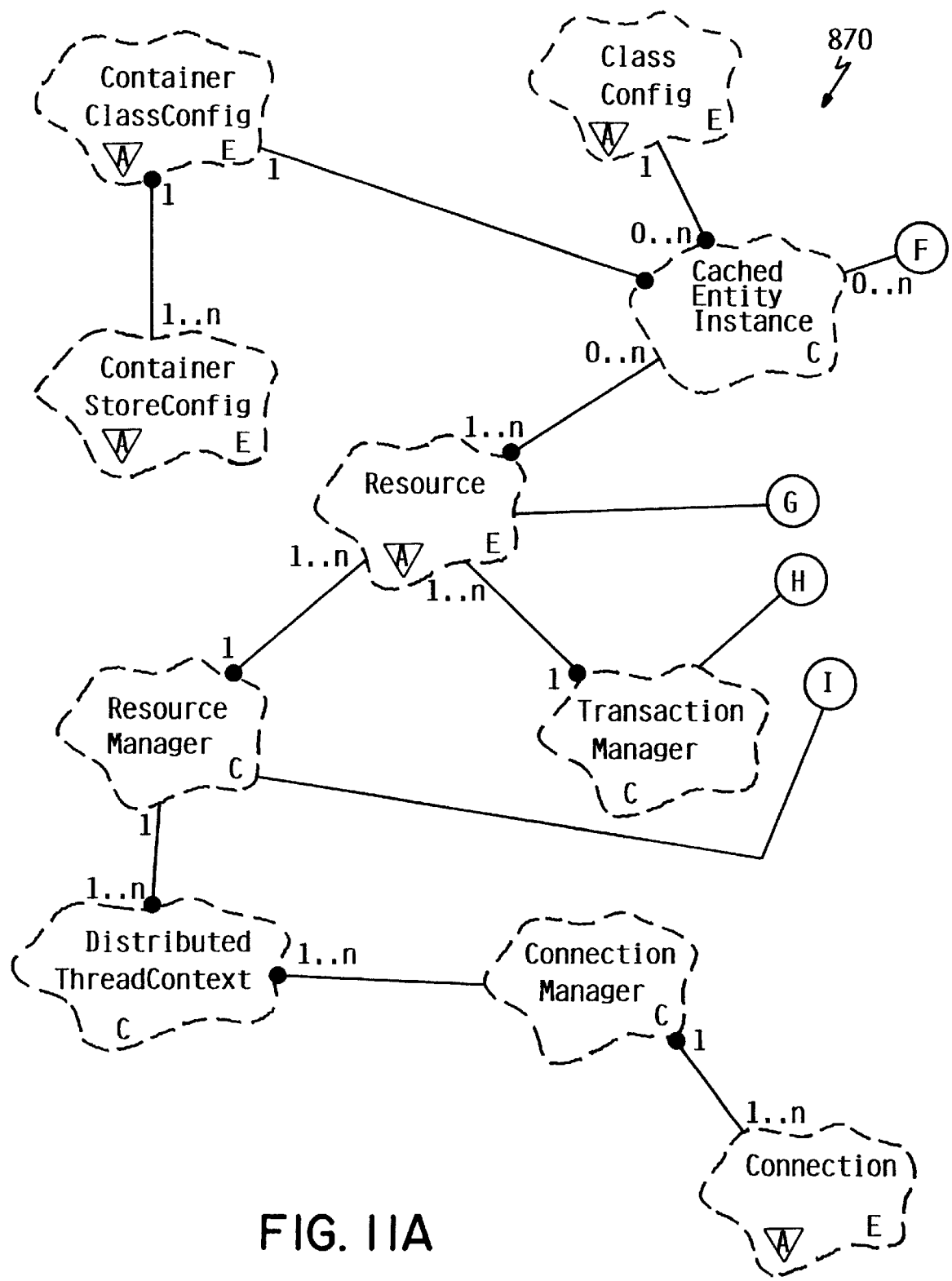
FIGS. 11–14 are class diagrams of a framework mechanism constructed in accordance with the teachings of the preferred embodiment.
Figure 11B:
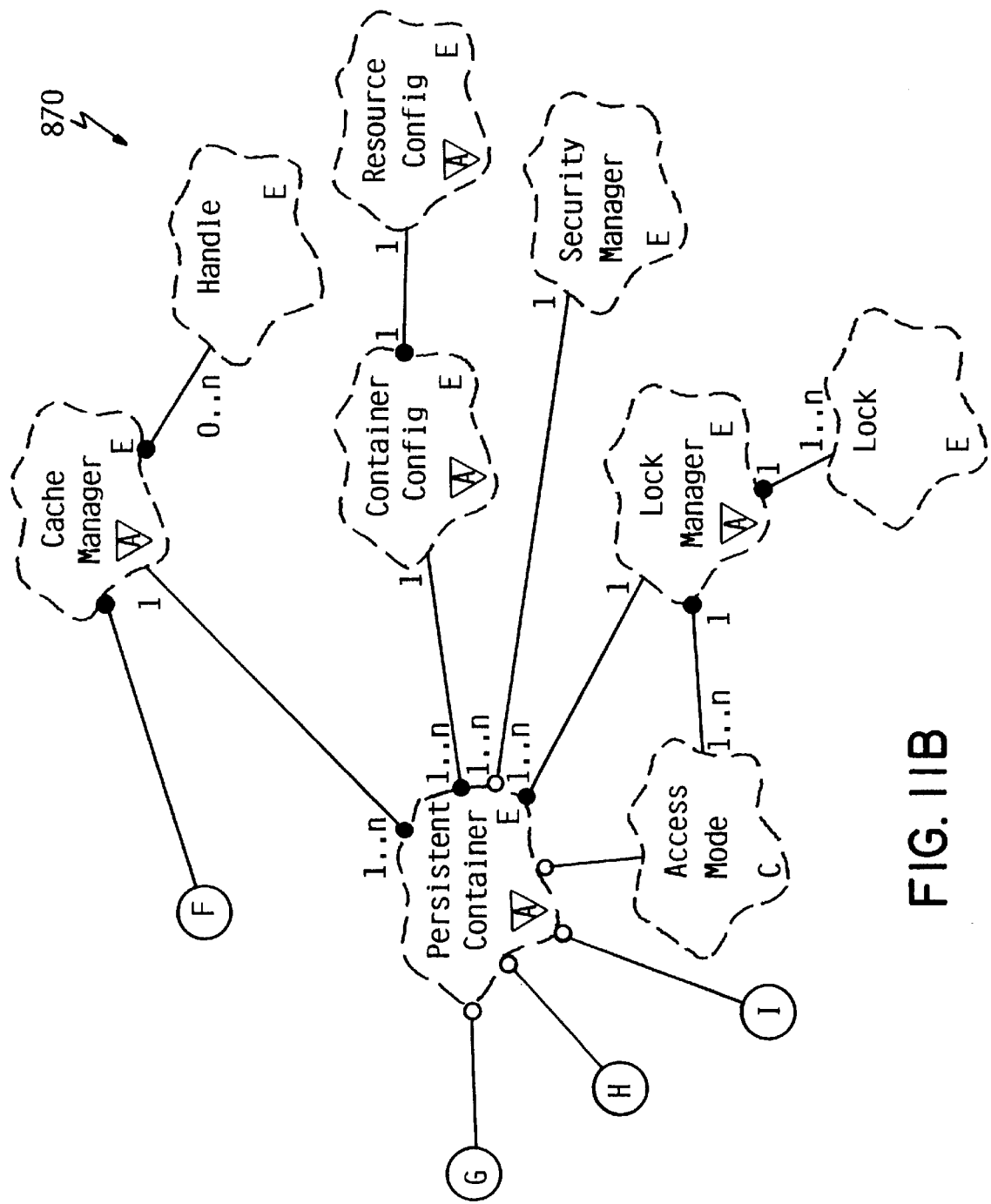

FIG. 11 is a top level class diagram of the classes used to implement persistent storage framework 870. PersistentContainer is an extensible abstract class that allows a framework consumer to define a new type of persistent container through appropriate subclassing. PersistentContainer provides the core container implementation required by all concrete container subclasses. The PersistentContainer class provides all the necessary interfaces required by the factory for managing the lifecycle of persistent objects. An object that desires to perform operations on object in a PersistentContainer must do so through the methods provided in PersistentContainer. For example, if a factory object needs to create, update, or delete anything stored in a PersistentContainer, the methods on PersistentContainer are invoked to accomplish these functions. PersistentContainer also includes all the necessary methods required for a persistent object stored in the PersistentContainer to participate in transactions. This includes methods for getting access to, dropping access to, and persisting the entity to persistent storage.

PersistentContainer defines a number of other methods as well. One of these methods is create(), which is a constructor method that creates a persistent container. Containers are instantiated dynamically by an object (such as a factory) as needed. A factory object first retrieves the string to object mapping of the container ID to the ContainerConfig object and passes the ContainerConfig object to the create() constructor method for the PersistentContainer. In addition, PersistentContainer defines methods createEntity(), deleteEntity(), and getEntity() that create, delete, and retrieve, respectively, an entity (i e., persistent object) in the PersistentContainer. All requests for object creation, deletion, and updating are routed through the appropriate PersistentContainer.

The PersistentContainer class has a "has" relationship with each of the CacheManager class, the ContainerConfig class, and the LockManager class, indicating that each PersistentContainer object will have an associated CacheManager object, ContainerConfig object, and LockManager object. In addition, PersistentContainer has a "using" relationship with the AccessMode class, the SecurityManager class, the Resource class, the ResourceManager class, and the TransactionManager class.

The AccessMode class is a core class that defines allowable ways to access an entity. The LockManager class is responsible for providing concurrency control of objects stored in persistent containers defined by framework 870. LockManager has a "has" relationship with the Lock class and with the AccessMode class, indicating that a lock manager will have one or more locks and an AccessMode that dictate how the objects are managed. The PersistentContainer class provides the sole interfaces for accessing and locking a persistent object. LockManager defines the methods lockEntity() and unlockEntity() to perform locking of entities (ie., persistent objects) according to the access mode provided as a parameter to the method calls. This assures that data written to a PersistentContainer is the correct data, reconciling any differences between stored data and cached data.

The SecurityManager class performs all security functions for the persistent containers defined by framework 870, such as task and object-level security. PersistentContainer provides methods that interface with methods on SecurityManager for authorizing users to tasks and object data. Specifically, SecurityManager defines methods checkRead(), checkWrite(), checkCreate() and checkDelete() for checking authority for reading, writing, creating and deleting entities, respectively. Varying levels and types of security may be provided by the SecurityManager, such as user security and server process security.

A persistent storage environment requires a framework consumer to extend several classes that collectively define a persistent storage environment. Generally, a persistent storage environment is created by creating or specifying subclasses from the following classes: PersistentContainer, ContainerClassConfig; ContainerConfig; ResourceConfig, and ContainerStoreConfig. ContainerConfig is an abstract extensible class that defines configuration data corresponding to one or more persistent containers. This configuration data includes the container ID value that is assigned when the container is configured. This container ID is stored in all persistent handles created by framework 870. ContainerConfig includes methods getContainer(), getContainerClassConfigs() and getResourceConfig() which return the container name, the ContainerClassConfig object and the ResourceConfig object, respectively, that correspond to the persistent storage environment that ContainerConfig is a part of. Note that specifying a ContainerClassConfig object automatically specifies a corresponding ContainerStoreConfig object as well because the ContainerClassConfig class has a "has" relationship with the ContainerStoreConfig class.

ResourceConfig is an abstract extensible class that is contained by the ContainerConfig class. ResourceConfig defines configuration data for a particular type of transactional resource. For example, ResourceConfig defines the corresponding Resource class that is used by a container. For an XA transaction, the ResourceConfig object contains the xa_open and close string information.

CacheManager is an abstract extensible class that defines how objects are cached in a particular persistent storage environment. In other words, a CacheManager object manages the in-memory objects that are owned by a corresponding persistent container. CacheManager defines methods getCachedEntity(), putCachedEntity(), and removeCachedEntity() that retrieve, store, and delete, respectively, cached entities in the cache. CacheManager has a "has" relationship with CachedEntityInstance and Handle. The CachedEntityInstance class is a core class that is used to define an in-memory copy of objects stored in a particular persistent container. CachedEntityInstance is a wrapper class of an in-memory object. The Handle class is an extensible class used by CacheManager to identify objects stored in a persistent container.

CachedEntityInstance has a "has" relationship with the ClassConfig class and the ContainerClassConfig class. Furthermore, the Resource class has a "has" relationship with the CachedEntityInstance class, indicating that a resource object may have a corresponding cached entity instance object. The ClassConfig class is an abstract extensible class that defines configuration data corresponding to class names. ClassConfig maps a class ID to a fully qualified class name, and includes methods to determine the class name given the class ID and vice versa. The mapping is unique and is used to show class names to a framework consumer rather than class IDs.

ContainerClassConfig is an abstract extensible class that defines configuration data for classes within a container. It is used to determine which classes a container supports, and to map to data the specific container type needed to support persisting instances of that class. For example, for an ODBC container, the configuration object contains the class name of the schema mapping class that provides the logic necessary for performing the transformation from object schema to relational schema. These objects contain a reference to one or more ContainerStoreConfig objects described below.

ContainerStoreConfig is an abstract extensible class that defines a container store that represents an extent of storage that a container has configured to use. For example, for an ODBC container, the ContainerStoreConfig objects would define the table or set of tables occupied by this class in the relational database over which the container is defined. For single-level store (SLS) containers, this object contains information such as the SLS pool.

Resource is an abstract extensible class that identifies one or more resources that correspond to a particular persistent storage environment. The PersistentContainer is responsible for creating, initializing and registering a Resource object to the corresponding TransactionManager. The class TransactionManager is a core class that has a "has" relationship with the Resource class, indicating that an object instantiated under the TransactionManager class has one or more corresponding resource objects. TransactionManager carries out the transaction control by interacting with objects of the extensible Resource class that are registered to it. ResourceManager is a concrete core class that maintains a list of available and used transactional resources that are available for use by a particular thread. The PersistentContainer interfaces with the ResourceManager class to obtain the necessary transactional resource to use for any given container method. The Resource objects are registered with the transaction service and the objects stored in the container are registered to the Resource. Thus, the TransactionManager (i.e., transaction service) maintains a reference to the Resource, which maintains references to all the CachedEntityInstances that have been registered to the transaction. ResourceManager has a "has" relationship with the Resource class, indicating that an object instantiated under the ResourceManager class has one or more corresponding Resource objects. Extensibility of the Resource objects that are referenced by the ResourceManager is required in order for framework consumers to add additional persistent storage systems (i.e., datastores) to a system defined by framework 870. Extensibility is achieved by the way in which the ResourceManager and PersistentContainer interact to obtain an appropriate Resource for the request. The PersistentContainer passes the ResourceConfig object that is referenced by the ContainerConfig object. The ResourceConfig class contains both a resource type (which must be enforced to be unique) and a Resource class. Because this ContainerConfig object itself is configurable, each container can be set up to use the appropriate Resource class.

DistributedThreadContext (DTC) is a core class that defines a context for one or more distributed threads used in a distributed object system. DTC has a "has" relationship with the ResourceManager class, indicating that one or more DistributedThreadContext objects has a corresponding ResourceManager. DTC also has a "has" relationship with the ConnectionManager class, indicating that each DTC has a corresponding ConnectionManager.

ConnectionManager is a concrete core class that operates similar to the ResourceManager. Each Resource type is allocated a bucket of connections to use for its communication to the datastore for any given DistributedThreadContext. Thus, each distributed thread has a set of connection buckets equal to the number of Resource types currently configured in the network. The concrete persistent container classes ask for a connection from the ConnectionManager and pass the container reference. The ConnectionManager then uses the ContainerConfig object to get to the ResourceConfig object for the container. This ResourceConfig object contains the unique resource type for the Resource. This allows the ConnectionManager to locate the bucket of interest. Once the correct bucket is determined, the ConnectionManager invokes an abstract method on the PersistentContainer object to get the connection key that defines which Connection within the bucket will satisfy the get connection request. This allows each concrete persistent container the ability to indicate the connection string that will satisfy its connection requirements. Note that ConnectionManager has a "has" relationship with the Connection class, indicating that each ConnectionManager object has one or more corresponding Connections that it manages. Connections is an abstract extensible class that defines a connection that may be used to satisfy connection requests, such as OdbcConnection and PosixConnection.

All of the relationships between classes in FIG. 11 are core relationships, which a user of the framework may not alter. As such, they are part of the core function of framework 870.

Figure 12:
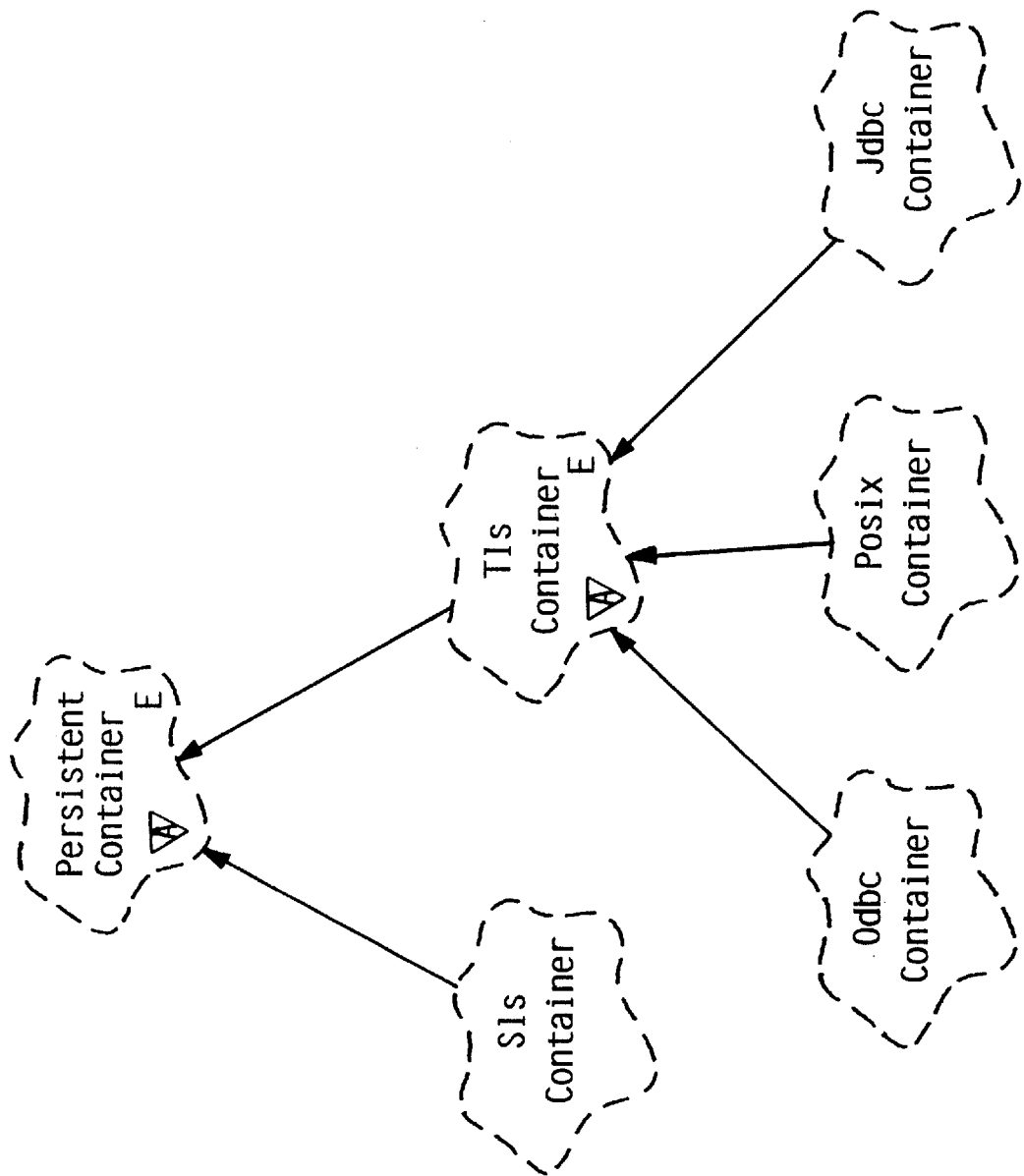

Referring now to the class diagram of FIG. 12, the PersistentContainer class has been subclassed to define a single-level store (SLS) container and an abstract two-level store (TLS) container. The TLS container is further subclassed to define an OdbcContainer, a PosixContainer, and a JdbcContainer. The SLS, ODBC, Posix and JDBC containers in FIG. 12 are examples of concrete containers defined by appropriate subclassing of the PersistentContainer class.

Figure 13:
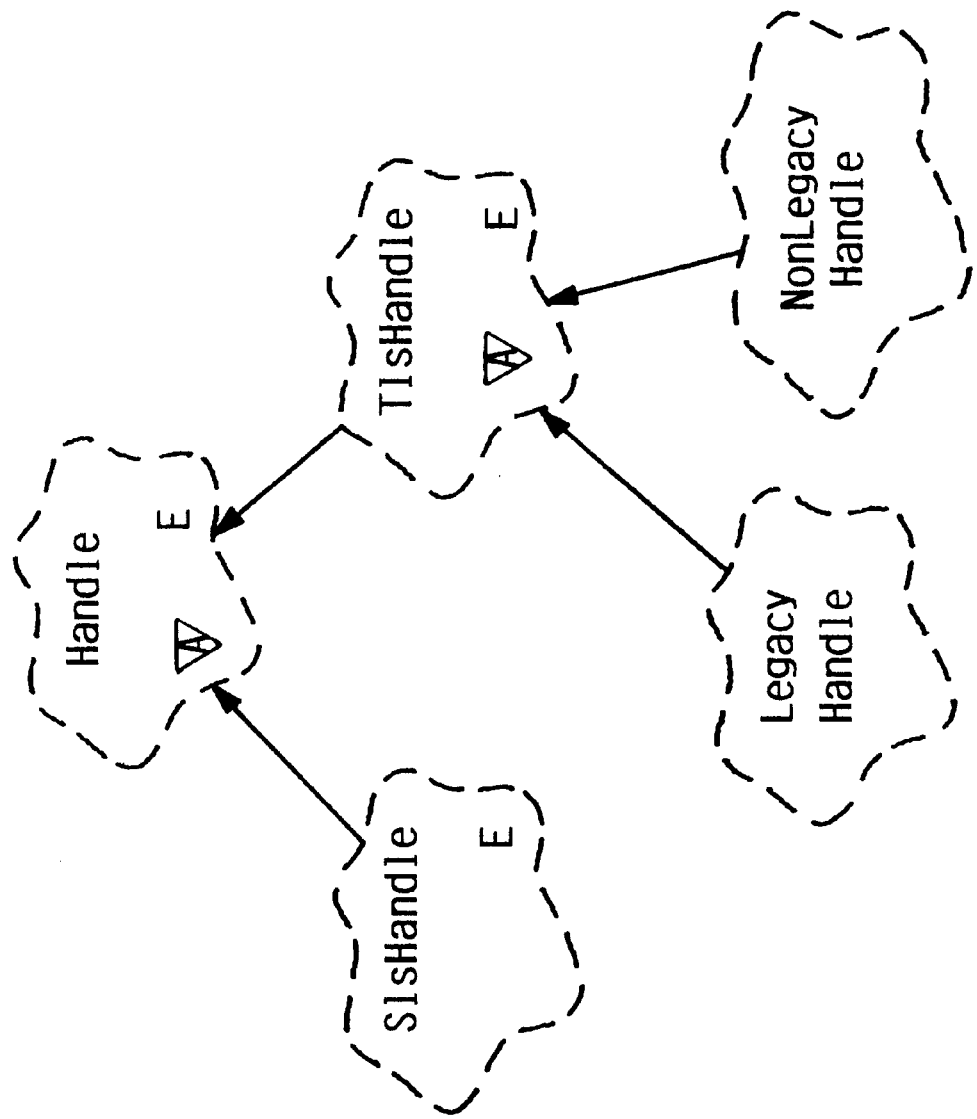

In addition to subclassing from PersistentContainer, a framework consumer must also subclass from the Handle class to define concrete handles for each persistent container. For the example of FIG. 12, appropriate subclassing of the abstract Handle class is shown in FIG. 13. Specifically, Handle is subclassed to define an SLSHandle and a TLSHandle. Furthermore, the abstract TLSHandle is subclassed to define a LegacyHandle and a Non-LegacyHandle. SLSHandle defines a handle that may be used to identify objects in the SLSContainer class. LegacyHandle defines a handle that may be used as a legacy key for rational databases such as the OdbcContainer and JdbcContainer. The Non-LegacyHandle is a handle that may be used by containers that do not use legacy keys, such as PosixContainer.

Figure 14:
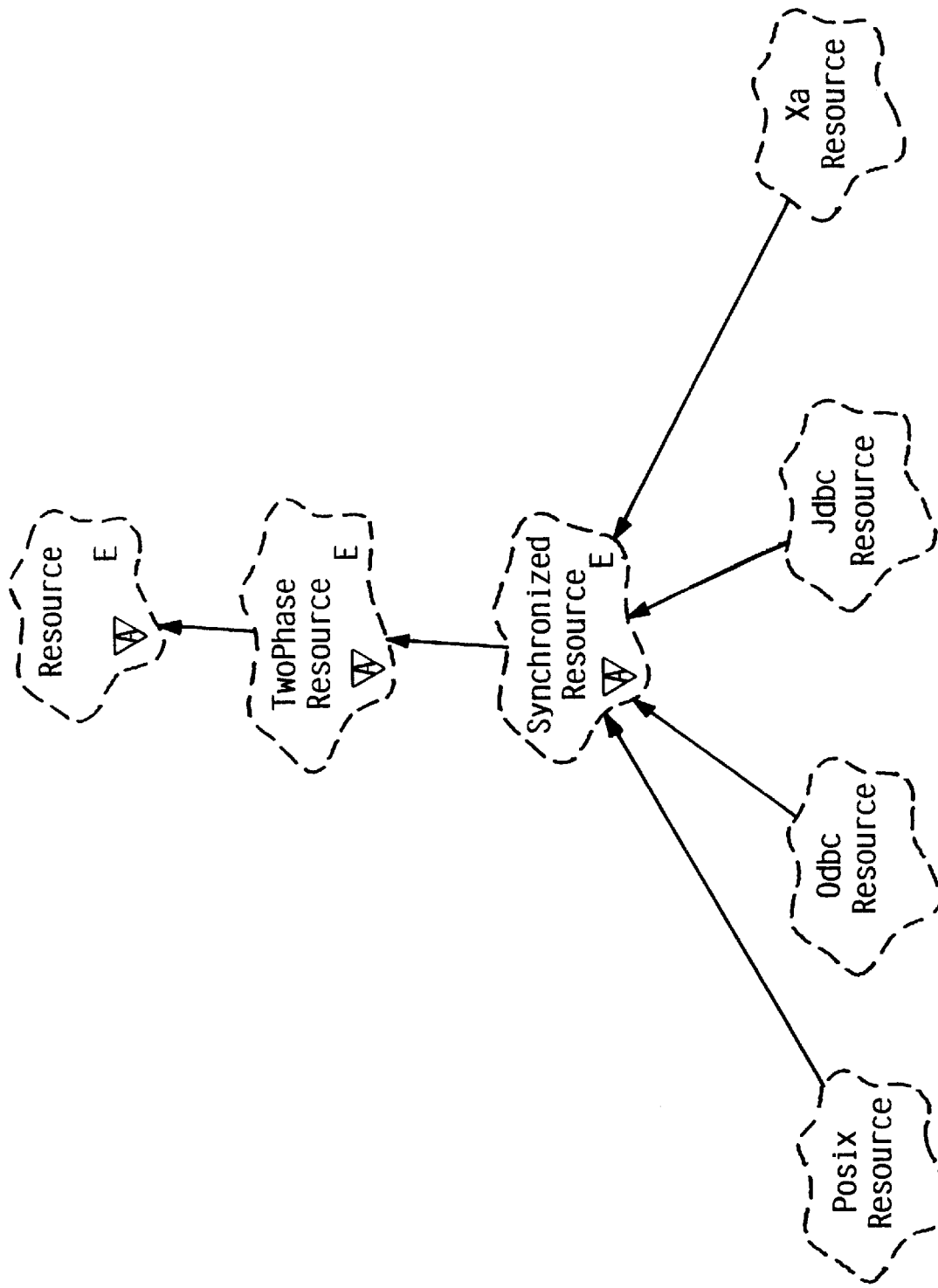

Referring to FIG. 14, appropriate subclassing of the Resource class is shown to define different types of resources. Resource is subclassed to define a TwoPhaseResource class, which is an abstract extensible class. SynchronizedResource is further subclassed from TwoPhaseResource to define a two phase resource that is synchronized. SynchronizedResource is then subclassed to define several concrete subclasses, namely: PosixResource, OdbcResource, JdbcResource, and XAResource. These resources are responsible for handling the transaction flows during commit, rollback, and recovery processing. PosixResource is a resource that is implemented for Posix files. OdbcResource performs single-phase commit on ODBC connections, and is only valid on ODBC containers. XAResource is a resource that performs two-phase commit against a relational database (such as an ODBC or JDBC) using XA interfaces according to the X/OPEN XA standard that defines transactional activity program interfaces (APIs) for two-phase commitment control. XAResource is used to perform a two-phase commit against either ODBC or JDBC. JdbcResource provides single-phase commit for JDBC containers. The JDBC APIs for single-phase commitment are different than ODBC APIs for single-phase commit, and thus a different implementation for JdbcResource is necessary.

Figure 15A:
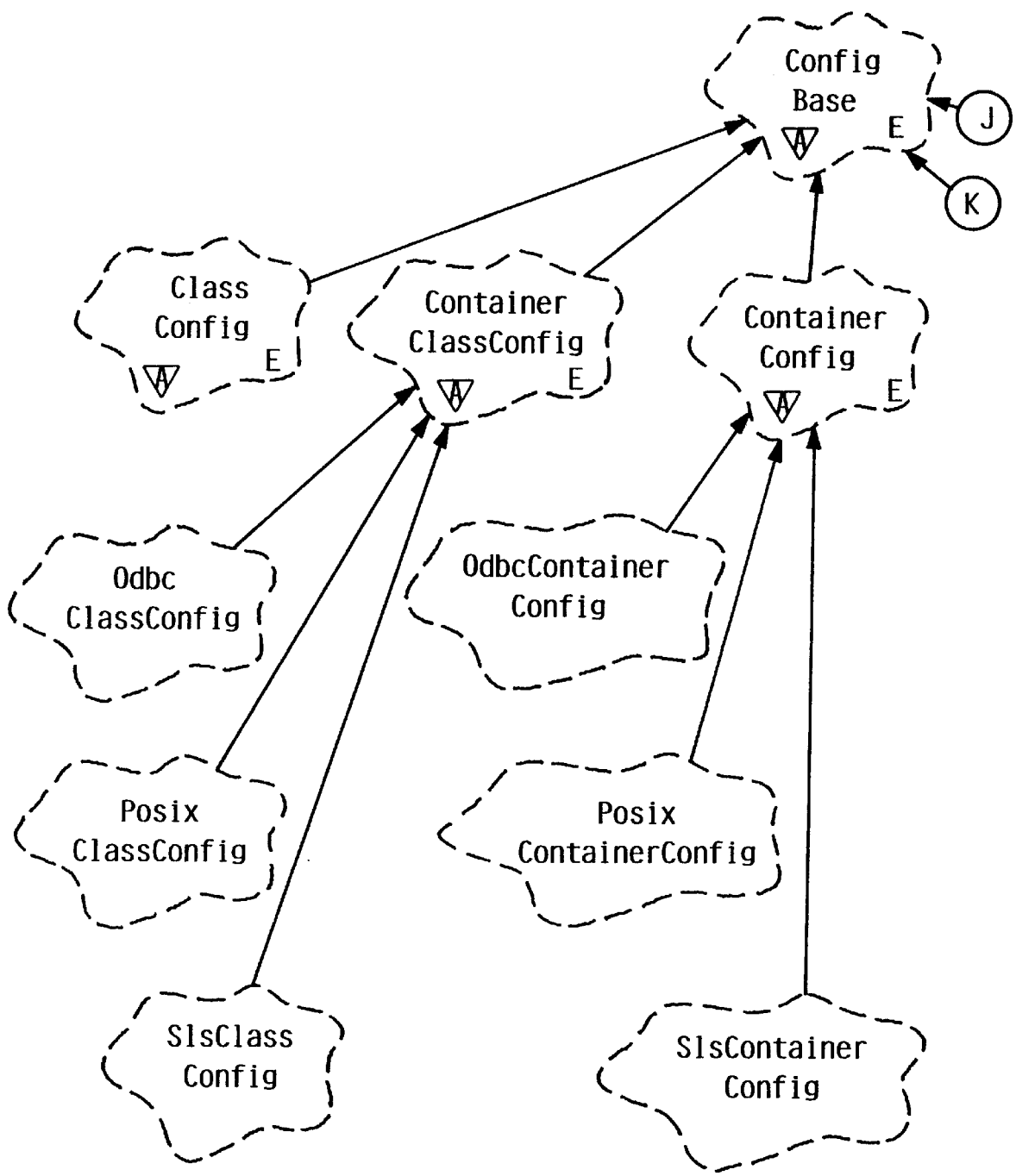
FIG. 15 is a class diagram showing the extension of the framework to implement three specific persistent storage environments.
Figure 15B:
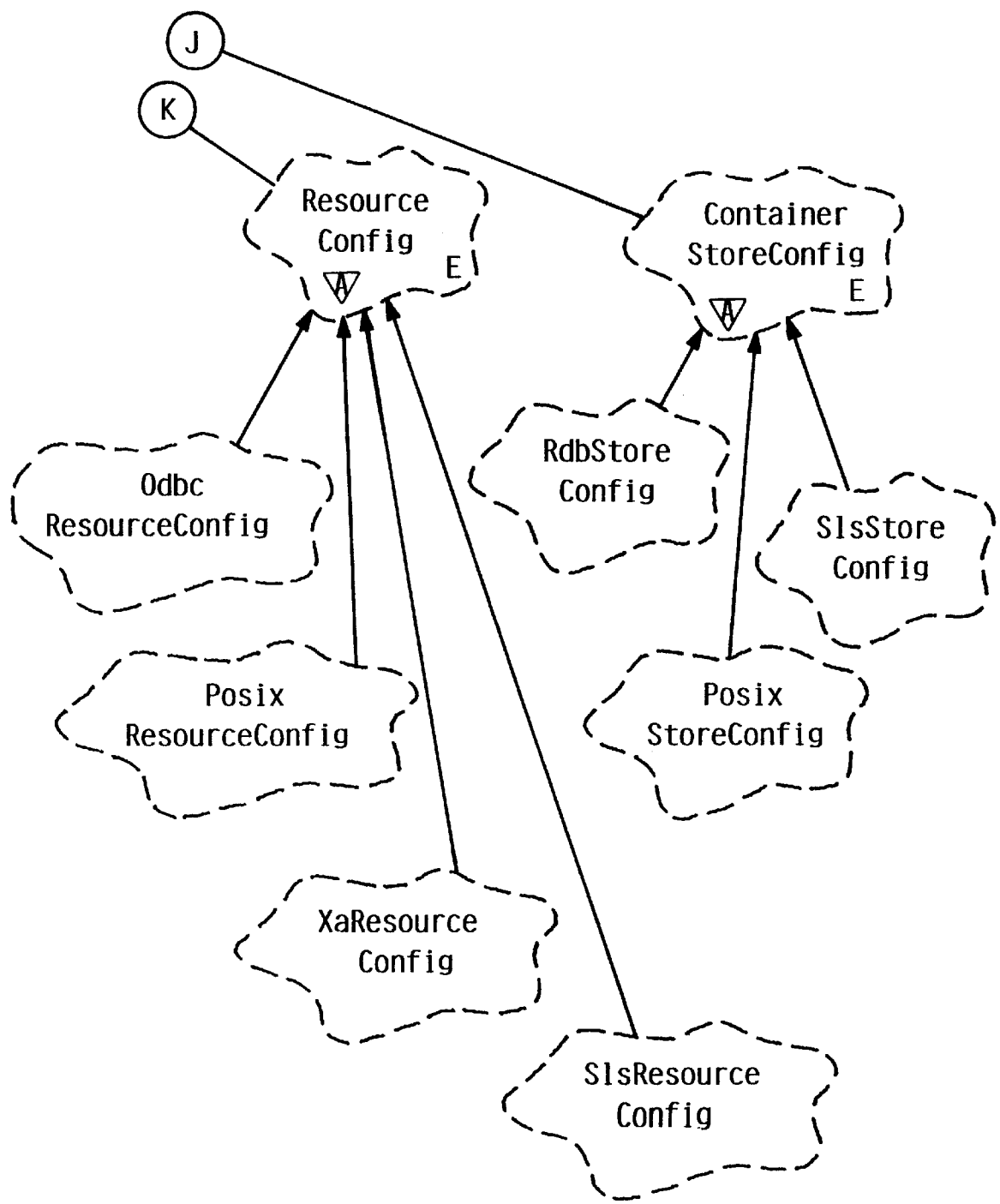

The class diagram of FIG. 15 illustrates further subclassing to define ODBC, Posix and SLS persistent storage environments. Due to the similarity in methods and required data, the ClassConfig, ContainerClassConfig, ContainerConfig, ResourceConfig, and ContainerStoreConfig classes are all subclassed from a common ConfigBase abstract extensible class. Each of the following classes are subclassed to provide the concrete subclasses used by framework 870: ContainerClassConfig, ContainerConfig, ResourceConfig, and ContainerStoreConfig. OdbcClassConfig defines a concrete class configuration for an ODBC PersistentContainer; OdbcContainerConfig defines a concrete container configuration for an ODBC PersistentContainer; OdbcResourceConfig defines a single-phase commit resource configuration for an ODBC PersistentContainer; XAResourceConfig defines a two-phase commit resource configuration for an ODBC PersistentContainer; and RDBStoreConfig defines a container store configuration for an ODBC PersistentContainer.

In similar manner, PosixClassConfig, PosixContainerConfig, PosixResourceConfig, and PosixStoreConfig define concrete subclasses for these classes for a Posix PersistentContainer, and SLSClassConfig, SLSContainerConfig, SLSResourceConfig, and SLSStoreConfig define concrete subclasses for these classes for an SLS PersistentContainer.

Figure 16A:
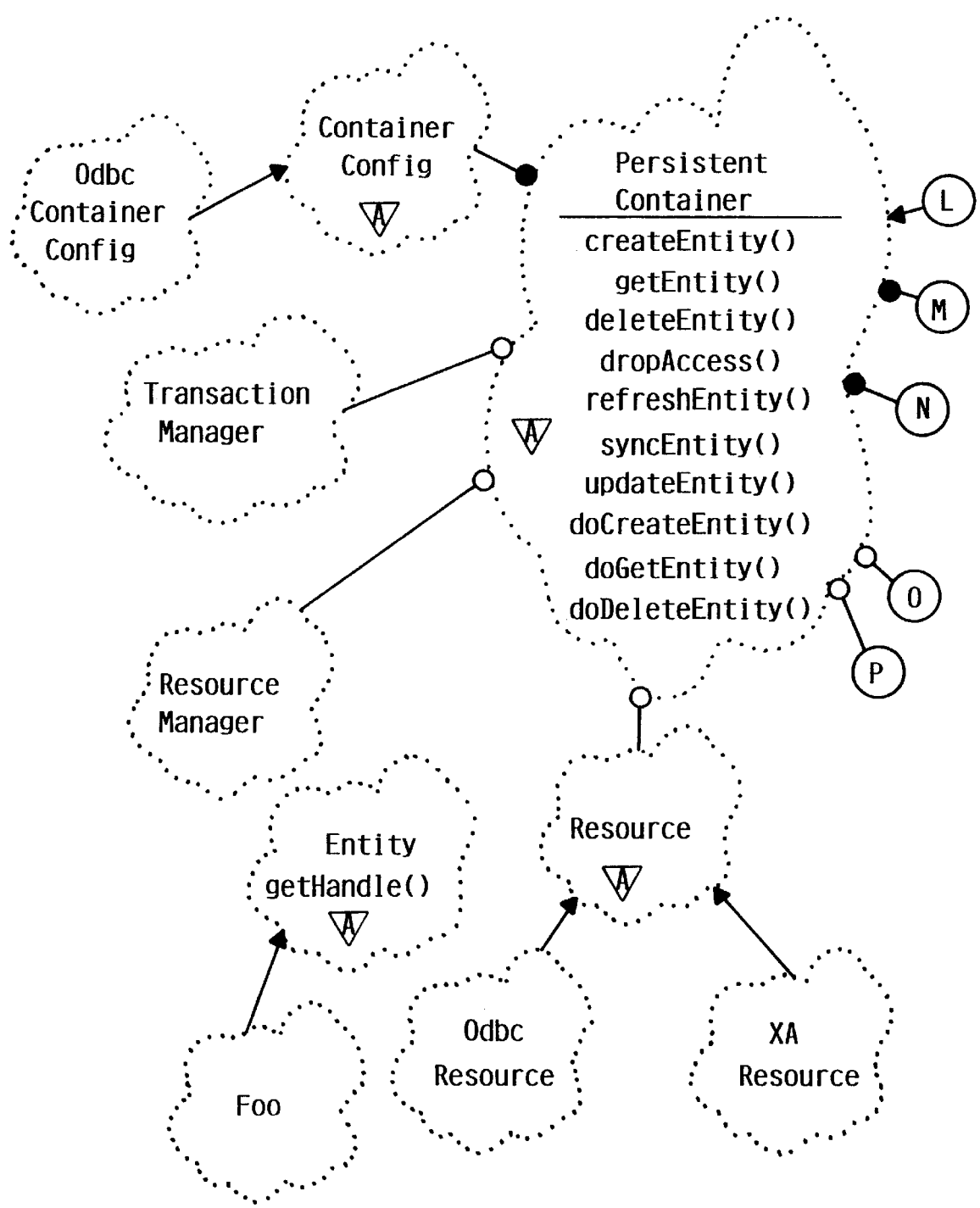
FIG. 16 is a class diagram showing the extension points for defining an ODBC persistent container.
Figure 16B:
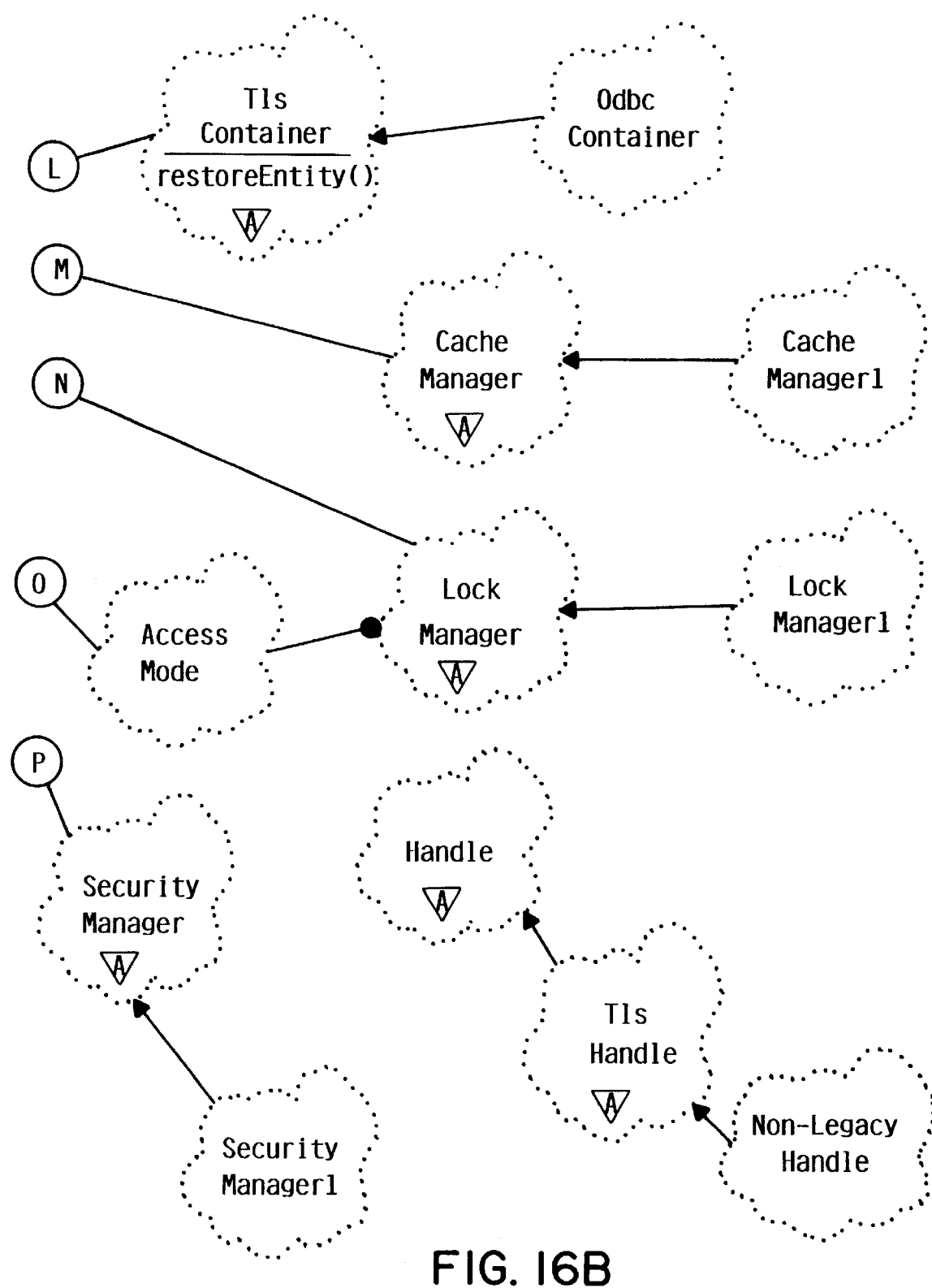

FIGS. 12–15 illustrate that framework 870 may be extended to define a number of different persistent storage environments. For the specific ODBC example shown in FIGS. 12–16, an ODBC persistent storage environment is defined by extending the framework to define the following concrete subclasses: OdbcContainer (FIGS. 12 & 16), NonLegacyHandle (FIGS. 13 and 16), OdbcResource (FIGS. 14 and 16), XAResource (FIG. 16), OdbcClassConfig (FIG. 15), OdbcContainerConfig (FIGS. 15 & 16), OdbcResourceConfig (FIG. 15), XAResourceConfig (FIG. 15), RDBStoreConfig (FIG. 15), CacheManagerl (FIG. 16), LockManagerl (FIG. 16), SecurityManagerl (FIG. 16). In similar manner, a Posix or JDBC persistent storage environment may be defined by extending the framework to define appropriate concrete subclasses.

PersistentContainer defines a set of methods, some of which are extensible and some of which are core. The core methods within PersistentContainer include: createEntity(), getEntity(), deleteEntity(), dropAccess(), refreshEntity(), syncEntity(), and updateEntity(). The core methods in PersistentContainer are defined by framework 870, and may not be modified by the user. Extensible methods within PersistentContainer include doCreateEntity(), doGetEntity(), and doDeleteEntity(), which are defined in subclasses of PersistentContainer to perform these functions for a particular persistent storage environment. The core methods within PersistentContainer invoke the extensible methods in concrete subclasses of PersistentContainer when appropriate to perform datastore-specific logic. For example, the getEntity() core method in PersistentContainer invokes a doGetEntity() method at the point in time when it needs the desired container subclass logic to actually perform the necessary interaction with the datastore to retrieve the entity from persistent storage. The getEntity() method performs numerous functions before and after the call to doGetEntity (), as explained below with reference to the object diagram of FIG. 17.

Core Functions

FIG. 11 best distinguishes between core and extensible functions in the persistent storage framework of the present invention. Specifically, as noted above, many of the classes in this framework are extensible classes, and some are core classes. The core classes include: AccessMode, CachedEntitylnstance, TransactionManager, ResourceManager, DistributedThreadContext, and ConnectionManager. All class relationships in framework 870 are core relationships, and may not be modified by the user of the framework. In fact, it is the fixed character of these relationships between classes that characterizes a framework and makes it useful and powerful. The core function of the persistent storage framework is defined by the core classes, the core class relationships, and the functional requirements that cause the framework to behave in the desired manner. As described above with respect to FIG. 9, the overall core function of the persistent storage framework includes the steps of method 900. Note, however, that not all of the steps of method 900 need be implemented in a particular persistent storage environment. The various functions of FIG. 9 are core functions not because they are always performed, but because the framework provides support for the implementation of each of these steps. The specific steps that make up any persistent storage environment depend on how the user of the framework extends the classes and defines (or overrides) the appropriate methods.

The core function of framework 870 is partially defined by core methods in the PersistentContainer class, as described above. These methods provide for overall control of the persistence services and ensures that operations are performed in the appropriate logical sequence. The core methods defined by PersistentContainer are intended to be common to all persistent storage environments. These core methods ensure that the following types of functions are performed in the correct sequence: registering entities to the transaction, locking entities, invoking security control of entities, caching entities, and obtaining connections to the datastore that will store the entities.

Object Interaction

Figure 17A:
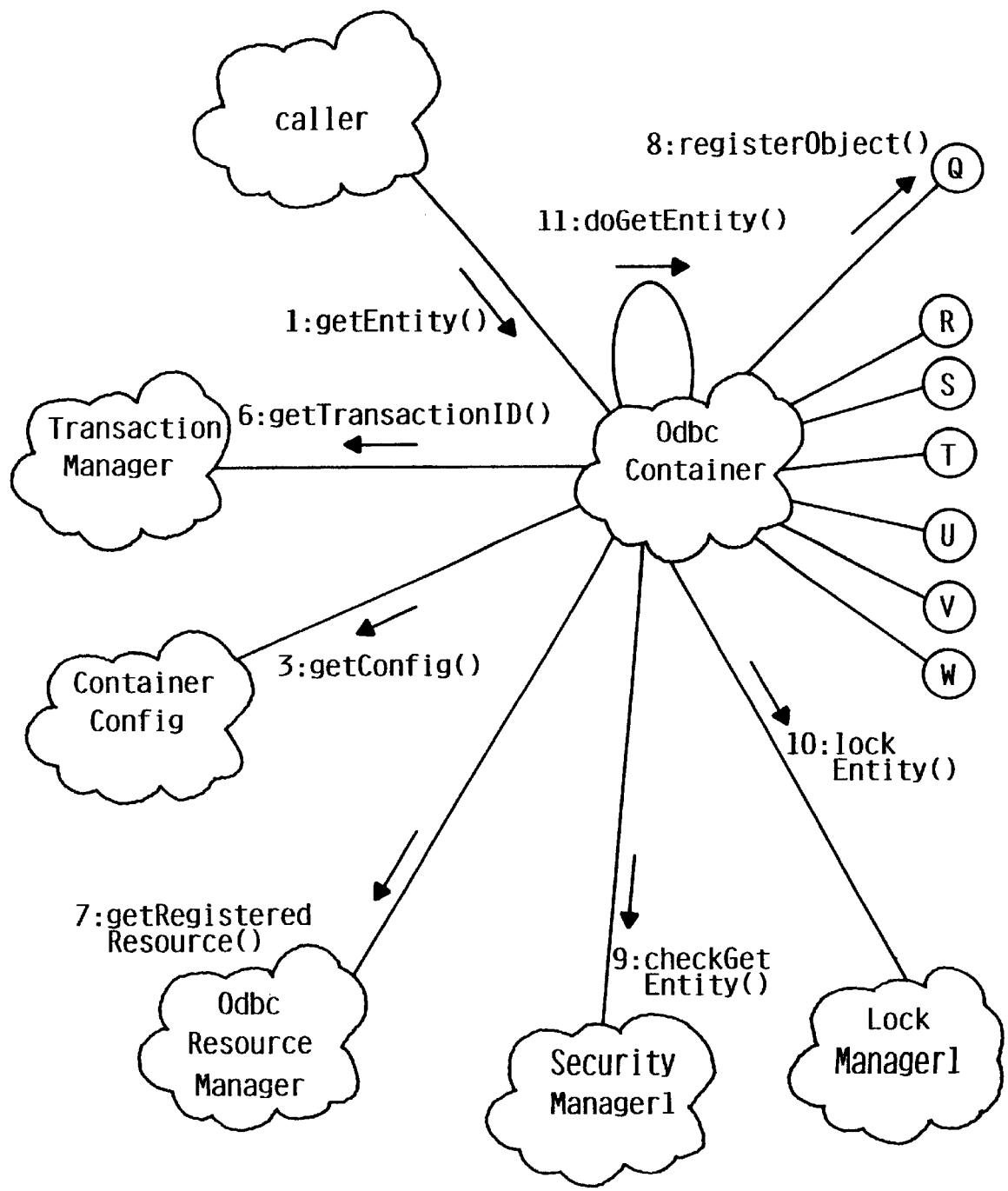
FIG. 17 is an object diagram of the ODBC persistent storage environment represented in FIG. 16.
Figure 17B:
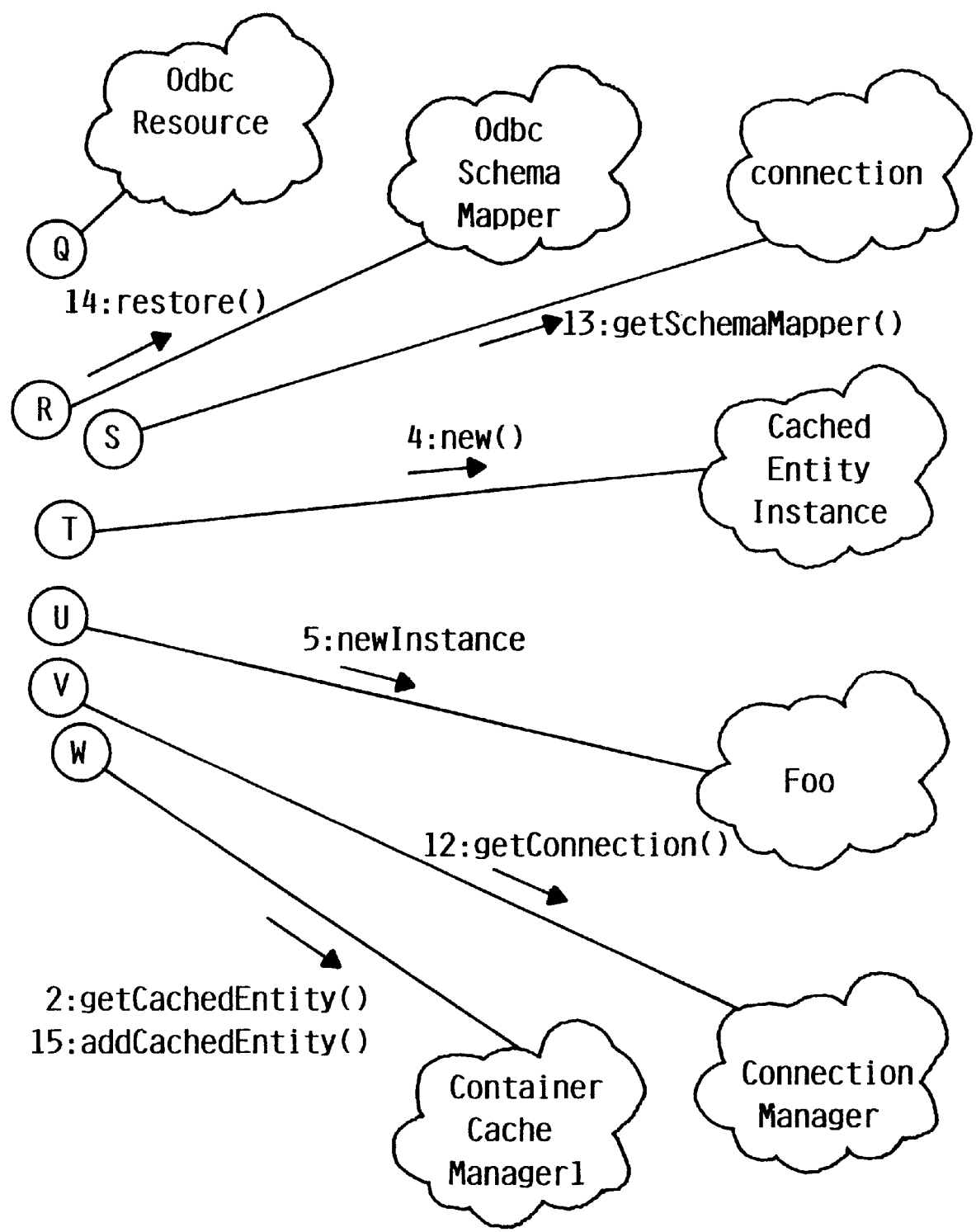

The operation of the framework of FIG. 11 may be best understood by the class diagrams of FIGS. 11–16 and the object diagram of FIG. 17. Many different persistent storage environments may be created by defining concrete subclasses, as explained above with reference to FIGS. 12–15. Of course, many more persistent storage environments may be implemented with the framework. If a persistent storage environment has the same common features with a different environment that is already implemented in the framework, the new environment may use the same subclass without having to duplicate the effort to re-generate the code from scratch. From this we see the power and flexibility of providing a persistent storage framework. In sum, the framework not only makes the programmer's job easier, but it also makes the code much more portable to other applications, and makes the code much easier to maintain.

The detailed operation of framework 870 in accordance with the present invention will now be illustrated with reference to the specific persistent storage environment shown in FIG. 17, which is an object diagram of one sample persistent storage environment which, for purposes of illustration, is the ODBC persistent storage environment. The function of the framework mechanism will now be described with reference to the specific methods referenced in FIG. 17.

We assume that a client object we arbitrarily name "caller" invokes the framework 870 by calling the getEntity() method on the OdbcContainer object. First we must determine whether the requested entity exists in the cache. To do this, OdbcContainer invokes the getCachedEntity() method on the ContainerCacheManangerl object. This example assumes that the entity is not in cache, so the entity must be retrieved from persistent storage. The next step is to invoke the getConfig() method on the ContainerConfig object (step 3) to determine the configuration of the ODBC container that contains the entity. A new CachedEntityInstance object is then instantiated (step 4), which is a wrapper object for the entity to be retrieved (and stored later in the cache). Next, the OdbcContainer object invokes a constructor method newInstance() on the entity (step 5), which we call for this example Foo, thereby creating an entity that does not yet have the appropriate date. At this point, the transaction identifier for this transaction is determined by invoking the getTransactionID() method on the TransactionManager object (step 6).

Next, OdbcContainer invokes the getRegisteredResource() method on the OdbcResourceManager object (step 7) to determine the resource that corresponds to the ODBC datastore. The getRegisteredResource() method returns the name of the resource, which in this particular example is OdbcResource. OdbcContainer then invokes the registerObject() method on OdbcResource (step 8) to register the entity with the appropriate resource. Next, OdbcContainer invokes checkGetEntity() on the SecurityManager1 object (step 9) to verify that the caller has sufficient security clearance to access the requested entity.

OdbcContainer then invokes the lockEntity() method on the LockManager1 object (step 10) to assure that the entity is not already locked, and to lock the entity for the duration of the current transaction. At this point all the needed checks have been performed, and the entity is accessed by invoking the doGetEntity() method on OdbcContainer (step 11), which delegates the functions required to retrieve the entity from the ODBC datastore to the appropriate concrete subclasses that know how to access the entity. The doGetEntity() method first invokes the getConnection() method on the ConnectionManager object (step 12), which returns the connection for retrieving the entity. Next, doGetEntity() invokes the getSchemaMapper() method on the appropriate connection corresponding to the ODBC datastore (step 13), which returns the OdbcSchemaMapper as the schema mapper that corresponds to the ODBC datastore. The doGetEntity() method then invokes the restore() method on the OdbcSchemaMapper object (step 14), which fluffs up the Foo object from the data stored in the ODBC datastore and stores this in cacheable form in the CachedEntityInstance. Finally, OdbcContainer invokes the addCachedEntity() method on the ContainerCacheManager1 object (step 15), which adds the CachedEntityInstance to the cache.

As the example above illustrates, the framework provides an extremely flexible and powerful tool for implementing any number of persistent storage environments by simply defining classes that implement the features specific to a particular persistent storage environment. The core methods defined by the PersistentContainer class interact with extensible methods to perform all needed functions in a particular persistent storage environment.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. Note that the term "user" or "framework consumer" as used in the specification and the claims denotes any human programmer or any software program that is capable of extending the framework mechanism to define a particular persistent storage environment.

We claim:

1. An apparatus comprising:
at least one processor; and
a memory coupled to the at least one processor, the memory containing an object-oriented framework mechanism that provides at least one persistent storage environment, the framework mechanism executing on the at least one processor, the framework mechanism comprising:

a container configuration class defining:
at least one container configuration object that contains configuration data corresponding to at least one of a plurality of persistent containers; and
a second set of object methods to return the name of the persistent container and to identify at least one object that contains additional information regarding the persistent storage environment;
a container class configuration class defining:
at least one container class configuration object that contains configuration data for at least one class in at least one persistent container that defines which classes the at least one persistent container supports;
a container store configuration class defining:
at least one container store configuration object that contains configuration data that defines a container store that represents an extent of storage that a persistent container has configured to use.

2. The apparatus of claim 1 wherein the framework mechanism comprises a persistent container class, the persistent container class defining:
at least one persistent container object for storing at least one object in the at least one persistent storage environment; and
a first set of object methods to perform a plurality of predetermined functions to at least partially implement the persistent storage environment.

3. The apparatus of claim 2 wherein the first set of object methods includes:
at least one object method that creates at least one object and stores the at least one object in the persistent container object;
at least one object method that retrieves at least one object from the persistent container object; and
at least one object method that deletes at least one object from the persistent container object.

4. The apparatus of claim 2 wherein the persistent container class is an extensible class of the framework mechanism, the implementation of which by a user at least partially defines the persistent storage environment.

5. The apparatus of claim 1 wherein the container configuration class, the container class configuration class, and the container store configuration class are extensible classes of the framework mechanism, the implementation of which by a user at least partially defines the persistent storage environment.

6. The apparatus of claim 1 wherein the framework mechanism further comprises:
a resource class defining:
at least one resource object corresponding to at least one transactional resource in the persistent storage environment;
a resource configuration class defining:
at least one resource configuration object that contains configuration data for the at least one resource object;
a resource manager class defining:
at least one resource manager object that contains a list of transactional resources that are available for use.

7. The apparatus of claim 6 wherein the framework mechanism further comprises:
a transaction manager class defining:
at least one transaction manager object that manages a transaction by interacting with at least one object corresponding to a transactional resource;

a lock manager class defining:
   at least one lock manager object that provides control of concurrent accesses to at least one object in the persistent storage environment; and
   a third set of object methods for locking and unlocking at least one object in the persistent storage environment;
a cache manager class defining:
   at least one cache manager object that manages at least one object in a cache;
   a fourth set of object methods for retrieving, storing, and deleting the at least one object in the cache;
a security manager class defining:
   at least one security manager object that checks for proper authorization to access at least one object in the persistent storage environment; and
a connection manager class defining:
   at least one connection manager object that allocates at least one connection for a transaction.

8. The apparatus of claim 7 wherein the framework mechanism further comprises:
an access mode class defining:
   at least one access mode object that interacts with the at least one lock manager object to determine how at least one object in the persistent storage environment may be accessed;
a lock class defining:
   at least one lock object that determines whether at least one object in the persistent storage environment is in a locked state;
a connection class defining:
   at least one connection object corresponding to a connection that may be allocated by the connection manager object to a transaction;
a distributed thread context class defining:
   at least one distributed thread context object that provides a context for at least one distributed thread used in the persistent storage environment;
a handle class defining:
   at least one handle object containing an identifier for uniquely identifying each object in the persistent storage environment.

9. The apparatus of claim 8 wherein the framework mechanism comprises:
a class configuration class defining:
   at least one class configuration object that contains a fully qualified class name corresponding to an object identifier in the persistent storage environment; and
   a fifth set of object methods for determining the class name from the object identifier and for determining the object identifier from the class name;
a cached entity instance class defining:
   at least one cached entity instance object containing an in-memory representation of at least one object in the persistent storage environment.

10. The apparatus of claim 9 wherein the persistent container class has a "has" relationship with the cache manager class, the container configuration class, and the lock manager class.

11. The apparatus of claim 9 wherein the persistent container class has a "using" relationship with the resource class, the transaction manager class, the resource manager class, the access mode class, and the security manager class.

12. The apparatus of claim 1 wherein the memory contains an application program that supports an object-oriented programming environment containing the framework mechanism, and wherein the framework mechanism is extended by providing information that implements the at least one persistent storage environment.

13. The apparatus of claim 1 wherein the framework mechanism comprises:
at least one core function defined by at least one core class and by the relationships between a plurality of classes within the framework mechanism, wherein the implementation of the at least one core function is defined by the framework mechanism and cannot be modified by a user of the framework mechanism; and
at least one extensible function defined by at least one extensible class, wherein the implementation of the at least one extensible function is defined by the user of the framework mechanism by extending the at least one extensible class.

14. An apparatus comprising:
at least one processor; and
a memory coupled to the at least one processor, the memory containing an object-oriented framework mechanism that provides at least one persistent storage environment, the framework mechanism executing on the at least one processor, the framework mechanism comprising:
a resource class defining:
   at least one resource object corresponding to at least one transactional resource in the persistent storage environment;
a resource configuration class defining:
   at least one resource configuration object that contains configuration data for the at least one resource object;
a resource manager class defining:
   at least one resource manager object that contains a list of transactional resources that are available for use.

15. The apparatus of claim 14 wherein the resource class and the resource configuration class are extensible classes of the framework mechanism, the implementation of which by a user at least partially defines the persistent storage environment; and wherein the resource manager class is a core class of the framework mechanism, the implementation of which cannot be modified by the user.

16. An apparatus comprising:
at least one processor; and
a memory coupled to the at least one processor, the memory containing an object-oriented framework mechanism that provides at least one persistent storage environment, the framework mechanism executing on the at least one processor, the framework mechanism comprising:
a transaction manager class defining:
   at least one transaction manager object that manages a transaction by interacting with at least one object corresponding to a transactional resource;
a lock manager class defining:
   at least one lock manager object that provides control of concurrent accesses to at least one object in the persistent storage environment; and
   a third set of object methods for locking and unlocking at least one object in the persistent storage environment;
a cache manager class defining:
   at least one cache manager object that manages at least one object in a cache;

a fourth set of object methods for retrieving, storing, and deleting the at least one object in the cache;

a security manager class defining:
  at least one security manager object that checks for proper authorization to access at least one object in the persistent storage environment; and a connection manager class defining:
  at least one connection manager object that allocates at least one connection for a transaction.

17. The apparatus of claim 16 wherein the lock manager class, the cache manager class, and the security manager class are extensible classes of the framework mechanism, the implementation of which by a user at least partially defines the persistent storage environment; and wherein the transaction manager class and the connection manager class are core classes of the framework mechanism, the implementation of which cannot be modified by the user.

18. The apparatus of claim 16 wherein the framework mechanism further comprises:

an access mode class defining:
  at least one access mode object that interacts with the at least one lock manager object to determine how at least one object in the persistent storage environment may be accessed;

a lock class defining:
  at least one lock object that determines whether at least one object in the persistent storage environment is in a locked state;

a connection class defining:
  at least one connection object corresponding to a connection that may be allocated by the connection manager object to a transaction;

a distributed thread context class defining:
  at least one distributed thread context object that provides a context for at least one distributed thread used in the persistent storage environment;

a handle class defining:
  at least one handle object containing an identifier that uniquely identifies each object in the persistent storage environment.

19. The apparatus of claim 18 wherein the lock class, the connection class, and the handle class are extensible classes of the framework mechanism, the implementation of which by a user at least partially defines the persistent storage environment; and wherein the access mode class and the distributed thread context class are core classes of the framework mechanism, the implementation of which cannot be modified by the user.

20. An apparatus comprising:
at least one processor; and
a memory coupled to the at least one processor, the memory containing an object-oriented framework mechanism that provides at least one persistent storage environment, the framework mechanism executing on the at least one processor, the framework mechanism comprising:

a class configuration class defining:
  at least one class configuration object that contains a fully qualified class name corresponding to an object identifier in the persistent storage environment; and
  a fifth set of object methods for determining the class name from the object identifier and for determining the object identifier from the class name; and a cached entity instance class defining:
  at least one cached entity instance object containing an in-memory representation of at least one object in the persistent storage environment.

21. The apparatus of claim 20 wherein the class configuration class is an extensible class of the framework mechanism, the implementation of which by a user at least partially defines the persistent storage environment; and wherein the cached entity instance class is a core class of the framework mechanism, the implementation of which cannot be modified by the user.

22. A method for supporting persistence of at least one object in an object-oriented system by providing at least one persistent container, the method comprising the steps of:

providing an extensible object-oriented framework mechanism that provides the at least one persistent container according to extended portions of the framework mechanism that are customized to provide a desired persistent storage environment: and executing the object-oriented framework mechanism on an apparatus, the executing object oriented framework mechanism performing the steps of:
  (a) checking a cache to determine if the at least one object is present in the cache;
  (b) determining the configuration for a selected persistent container;
  (c) allocating a transaction identifier to the at least one object; and
  (d) allocating a resource corresponding to the transaction identifier to the at least one object.

23. The method of claim 22 further including the step of:
extending the framework mechanism to define the desired persistent storage environment.

24. The method of claim 22 further including the steps of:
  (e) checking the security of a client object that desires to access the at least one object in the persistent container;
  (f) checking the lock state of the at least one object in the persistent container; and
  (g) fluffing up the at least one object in the persistent container;
  (h) storing the fluffed up object in the cache; and
  (i) returning the fluffed up object to the client object.

25. The method of claim 24 wherein the step of fluffing up the at least one object includes the steps of:

providing extensible portions of the framework mechanism that determine how the at least one object is created, stored, and retrieved from the persistent container; and the extensible portions retrieving state data from the persistent container corresponding to the at least one object and creating the at least one object from the state data.

26. A program product comprising:
(A) an object-oriented framework mechanism that provides at least one persistent storage environment, the framework mechanism including an extensible persistent storage mechanism that provides the at least one persistent storage environment according to extended portions of the framework mechanism, wherein the framework mechanism comprises:

a persistent container object corresponding to the at least one persistent storage environment; and a first set of object methods on the persistent container object to perform a plurality of predetermined functions to implement the persistent storage environment, the first set of object methods includes:
  at least one object method that creates at least one object and stores the at least one object in the persistent container object;

at least one object method that retrieves at least one object from the persistent container object; and at least one object method that deletes at least one object from the persistent container object; and (B) signal bearing media bearing the framework mechanism.

27. The program product of claim 26 wherein the signal bearing media comprises recordable media.

28. The program product of claim 26 wherein the signal bearing media comprises transmission media.

29. The program product of claim 26 wherein the framework mechanism further comprises:

at least one container configuration object that contains configuration data corresponding to at least one of a plurality of persistent containers;

a second set of object methods to return the name of the persistent container and to identify at least one object that contains additional information regarding the persistent storage environment;

at least one container class configuration object that contains configuration data for at least one class in at least one persistent container that defines which classes the at least one persistent container supports; and at least one container store configuration object that contains configuration data that defines a container store that represents an extent of storage that a persistent container has configured to use.

30. The program product of claim 29 wherein the framework mechanism further comprises:

at least one resource object corresponding to at least one transactional resource in the persistent storage environment;

at least one resource configuration object that contains configuration data for the at least one resource object;

at least one resource manager object that contains a list of transactional resources that are available for use.

31. The program product of claim 30 wherein the framework mechanism further comprises:

at least one transaction manager object that manages a transaction by interacting with at least one object corresponding to a transactional resource;

at least one lock manager object that provides control of concurrent accesses to at least one object in the persistent storage environment;

a third set of object methods for locking and unlocking at least one object in the persistent storage environment;

at least one cache manager object that manages at least one object in a cache;

a fourth set of object methods for retrieving, storing, and deleting the at least one object in the cache;

at least one security manager object that checks for proper authorization to access at least one object in the persistent storage environment; and at least one connection manager object that allocates at least one connection for a transaction.

32. The program product of claim 31 wherein the framework mechanism further comprises:

at least one access mode object that interacts with the at least one lock manager object to determine how at least one object in the persistent storage environment may be accessed;

at least one lock object that determines whether at least one object in the persistent storage environment is in a locked state;

at least one connection object corresponding to a connection that may be allocated by the connection manager object to a transaction;

at least one distributed thread context object that provides a context for at least one distributed thread used in the persistent storage environment; and at least one handle object containing an identifier that uniquely identifies each object in the persistent storage environment.

33. The program product of claim 32 wherein the framework mechanism further comprises:

at least one class configuration object that contains a fully qualified class name corresponding to an object identifier in the persistent storage environment;

a fifth set of object methods for determining the class name from the object identifier and for determining the object identifier from the class name; and at least one cached entity instance object containing an in-memory representation of at least one object in the persistent storage environment.

34. A program product comprising:

(A) an object-oriented framework mechanism that provides at least one persistent storage environment, the framework mechanism including an extensible persistent storage mechanism that provides the at least one persistent storage environment according to extended portions of the framework mechanism, wherein the framework mechanism comprises:

at least one container configuration object that contains configuration data corresponding to at least one of a plurality of persistent containers;

a second set of object methods to return the name of the persistent container and to identify at least one object that contains additional information regarding the persistent storage environment;

at least one container class configuration object that contains configuration data for at least one class in at least one persistent container that defines which classes the at least one persistent container supports; and at least one container store configuration object that contains configuration data that defines a container store that represents an extent of storage that a persistent container has configured to use; and (B) signal bearing media bearing the framework mechanism.

35. A program product comprising:

(A) an object-oriented framework mechanism that provides at least one persistent storage environment, the framework mechanism including an extensible persistent storage mechanism that provides the at least one persistent storage environment according to extended portions of the framework mechanism, wherein the framework mechanism comprises:

at least one resource object corresponding to at least one transactional resource in the persistent storage environment;

at least one resource configuration object that contains configuration data for the at least one resource object;

at least one resource manager object that contains a list of transactional resources that are available for use; and (B) signal bearing media bearing the framework mechanism.

36. A program product comprising:
(A) an object-oriented framework mechanism that provides at least one persistent storage environment, the framework mechanism including an extensible persistent storage mechanism that provides the at least one persistent storage environment according to extended portions of the framework mechanism, wherein the framework mechanism comprises:
   at least one transaction manager object that manages a transaction by interacting with at least one object corresponding to a transactional resource;
   at least one lock manager object that provides control of concurrent accesses to at least one object in the persistent storage environment;
   a third set of object methods for locking and unlocking at least one object in the persistent storage environment;
   at least one cache manager object that manages at least one object in a cache;
   a fourth set of object methods for retrieving, storing, and deleting the at least one object in the cache;
   at least one security manager object that checks for proper authorization to access at least one object in the persistent storage environment; and
   at least one connection manager object that allocates at least one connection for a transaction; and
(B) signal bearing media bearing the framework mechanism.

37. A program product comprising:
(A) an object-oriented framework mechanism that provides at least one persistent storage environment, the framework mechanism including an extensible persistent storage mechanism that provides the at least one persistent storage environment according to extended portions of the framework mechanism, wherein the framework mechanism comprises:
   at least one access mode object that interacts with the at least one lock manager object to determine how at least one object in the persistent storage environment may be accessed;
   at least one lock object that determines whether at least one object in the persistent storage environment is in a locked state;
   at least one connection object corresponding to a connection that may be allocated by the connection manager object to a transaction;
   at least one distributed thread context object that provides a context for at least one distributed thread used in the persistent storage environment; and
   at least one handle object containing an identifier that uniquely identifies each object in the persistent storage environment; and
(B) signal bearing media bearing the framework mechanism.

38. A program product comprising:
(A) an object-oriented framework mechanism that provides at least one persistent storage environment, the framework mechanism including an extensible persistent storage mechanism that provides the at least one persistent storage environment according to extended portions of the framework mechanism, wherein the framework mechanism comprises:
   at least one class configuration object that contains a fully qualified class name corresponding to an object identifier in the persistent storage environment;
   a fifth set of object methods for determining the class name from the object identifier and for determining the object identifier from the class name; and
   at least one cached entity instance object containing an in-memory representation of at least one object in the persistent storage environment; and
(B) signal bearing media bearing the framework mechanism.

39. An object-oriented framework mechanism for use in an apparatus that supports an object-oriented programming environment, the framework mechanism comprising:
   a persistent container object corresponding to the at least one persistent storage environment and a first set of object methods on the persistent container object to perform a plurality of predetermined functions to implement the persistent storage environment;
   at least one container configuration object that contains configuration data corresponding to at least one of a plurality of persistent containers and a second set of object methods to return the name of the persistent container and to identify at least one object that contains additional information regarding the persistent storage environment;
   at least one container class configuration object that contains configuration data for at least one class in at least one persistent container that defines which classes the at least one persistent container supports;
   at least one container store configuration object that contains configuration data that defines a container store that represents an extent of storage that a persistent container has configured to use;
   at least one resource object corresponding to at least one transactional resource in the persistent storage environment;
   at least one resource configuration object that contains configuration data for the at least one resource object;
   at least one resource manager object that contains a list of transactional resources that are available for use;
   at least one transaction manager object that manages a transaction by interacting with at least one object corresponding to a transactional resource;
   at least one lock manager object that provides control of concurrent accesses to at least one object in the persistent storage environment and a third set of object methods for locking and unlocking at least one object in the persistent storage environment;
   at least one cache manager object that manages at least one object in a cache and a fourth set of object methods for retrieving, storing, and deleting the at least one object in the cache;
   at least one security manager object that checks for proper authorization to access at least one object in the persistent storage environment;
   at least one connection manager object that allocates at least one connection for a transaction;
   at least one access mode object that interacts with the at least one lock manager object to determine how at least one object in the persistent storage environment may be accessed;
   at least one lock object that determines whether at least one object in the persistent storage environment is in a locked state;
   at least one connection object corresponding to a connection that may be allocated by the connection manager object to a transaction;
   at least one distributed thread context object that provides a context for at least one distributed thread used in the persistent storage environment;

at least one handle object containing an identifier that uniquely identifies each object in the persistent storage environment;

at least one class configuration object that contains a fully qualified class name corresponding to an object identifier in the persistent storage environment and a fifth set of object methods for determining the class name from the object identifier and for determining the object identifier from the class name; and at least one cached entity instance object containing an in-memory representation of at least one object in the persistent storage environment.

40. The object-oriented framework mechanism of claim 39 wherein the framework mechanism comprises:

at least one core function defined by relationships between a plurality of classes within the framework mechanism, wherein the implementation of the at least one core function is defined by the framework mechanism and cannot be modified by a user of the framework mechanism; and at least one extensible function defined by at least one extensible class, wherein the implementation of the at least one extensible function is defined by the user of the framework mechanism by extending the at least one extensible class.

41. A method for supporting persistence of at least one object in an object-oriented system by providing at least one persistent container, the method comprising the steps of:

(A) providing a persistent container object corresponding to the at least one persistent storage environment, the persistent container object including a first set of object methods on the persistent container object to perform a plurality of predetermined functions to implement the persistent storage environment;

(B) providing a persistent container object corresponding to the at least one persistent storage environment and a first set of object methods on the persistent container object to perform a plurality of predetermined functions to implement the persistent storage environment;

(C) providing at least one container configuration object that contains configuration data corresponding to at least one of a plurality of persistent containers and a second set of object methods to return the name of the persistent container and to identify at least one object that contains additional information regarding the persistent storage environment;

(D) providing at least one container class configuration object that contains configuration data for at least one class in at least one persistent container that defines which classes the at least one persistent container supports;

(E) providing at least one container store configuration object that contains configuration data that defines a container store that represents an extent of storage that a persistent container has configured to use;

(F) providing at least one resource object corresponding to at least one transactional resource in the persistent storage environment;

(G) providing at least one resource configuration object that contains configuration data for the at least one resource object;

(H) providing at least one resource manager object that contains a list of transactional resources that are available for use;

(I) providing at least one transaction manager object that manages a transaction by interacting with at least one object corresponding to a transactional resource;

(J) providing at least one lock manager object that provides control of concurrent accesses to at least one object in the persistent storage environment and a third set of object methods for locking and unlocking at least one object in the persistent storage environment;

(K) providing at least one cache manager object that manages at least one object in a cache and a fourth set of object methods for retrieving, storing, and deleting the at least one object in the cache;

(L) providing at least one security manager object that checks for proper authorization to access at least one object in the persistent storage environment;

(M) providing at least one connection manager object that allocates at least one connection for a transaction;

(N) providing at least one access mode object that interacts with the at least one lock manager object to determine how at least one object in the persistent storage environment may be accessed;

(O) providing at least one lock object that determines whether at least one object in the persistent storage environment is in a locked state;

(P) providing at least one connection object corresponding to a connection that may be allocated by the connection manager object to a transaction;

(Q) providing at least one distributed thread context object that provides a context for at least one distributed thread used in the persistent storage environment;

(R) providing at least one handle object containing an identifier that uniquely identifies each object in the persistent storage environment;

(S) providing at least one class configuration object that contains a fully qualified class name corresponding to an object identifier in the persistent storage environment and a fifth set of object methods for determining the class name from the object identifier and for determining the object identifier from the class name;

(T) providing at least one cached entity instance object containing an in-memory representation of at least one object in the persistent storage environment; and (U) executing the object-oriented framework mechanism on an apparatus to implement the persistent storage environment.

42. The method of claim 41 further including the step of: extending the framework mechanism to define the desired persistent storage environment.

43. A program product comprising:

(A) an object-oriented framework mechanism for supporting persistence of at least one object in an object-oriented system by providing at least one persistent container, the object-oriented framework including: a persistent container object corresponding to the at least one persistent storage environment and a first set of object methods on the persistent container object to perform a plurality of predetermined functions to implement the persistent storage environment; at least one container configuration object that contains configuration data corresponding to at least one of a plurality of persistent containers and a second set of object methods to return the name of the persistent container and to identify at least one object that contains additional information regarding the persistent storage environment; at least one container class configuration object that contains configuration data for at least one class in at least one persistent container that defines which classes the at least one persistent container supports; at least one container store configuration object that contains configuration data that defines a container store that represents an extent of storage that a persistent container has configured to use; at least one resource object corresponding to at least one transactional resource in the persistent storage environment; at least one resource configuration object that contains configuration data for the at least one resource object; at least one resource manager object that contains a list of transactional resources that are available for use; at least one transaction manager object that manages a transaction by interacting with at least one object corresponding to a transactional resource; at least one lock manager object that provides control of concurrent accesses to at least one object in the persistent storage environment and a third set of object methods for locking and unlocking at least one object in the persistent storage environment; at least one cache manager object that manages at least one object in a cache and a fourth set of object methods for retrieving, storing, and deleting the at least one object in the cache; at least one security manager object that checks for proper authorization to access at least one object in the persistent storage environment; at least one connection manager object that allocates at least one connection for a transaction; at least one access mode object that interacts with the at least one lock manager object to determine how at least one object in the persistent storage environment may be accessed; at least one lock object that determines whether at least one object in the persistent storage environment is in a locked state; at least one connection object corresponding to a connection that may be allocated by the connection manager object to a transaction; at least one distributed thread context object that provides a context for at least one distributed thread used in the persistent storage environment; at least one handle object containing an identifier that uniquely identifies each object in the persistent storage environment; at least one class configuration object that contains a fully qualified class name corresponding to an object identifier in the persistent storage environment and a fifth set of object methods for determining the class name from the object identifier and for determining the object identifier from the class name; at least one cached entity instance object containing an in-memory representation of at least one object in the persistent storage environment; wherein the object-oriented framework mechanism provides persistence of the at least one object according to extended portions of the framework mechanism that are customized to provide the desired persistent storage environment; and (B) signal bearing media bearing the object-oriented framework mechanism.

44. The program product of claim 43 wherein the signal bearing media comprises recordable media.

45. The program product of claim 43 wherein the signal bearing media comprises transmission media.

46. The program product of claim 43 wherein the persistent container class, the container configuration class, the container class configuration class, the container store configuration class, the resource configuration class, the resource class, the lock manager class, the cache manager class, the security manager class, the lock class, the connection class, the handle class, and the class configuration class are extensible classes of the framework mechanism, the implementation of which by a user defines the at least one persistent storage environment.

47. The program product of claim 46 wherein the resource manager class, the transaction manager class, the connection manager class, the access mode class, the distributed thread context class, and the cached entity instance class are core classes of the framework mechanism, the implementation of which cannot be modified by a user.

48. An object-oriented framework mechanism that supports persistence of at least one object in an object-oriented system by providing at least one persistent container, the framework mechanism comprising:

at least one core function defined by relationships between a plurality of classes within the framework mechanism, wherein the implementation of the at least one core function is defined by the framework mechanism and cannot be modified by a user of the framework mechanism;

at least one extensible class wherein the implementation of the at least one extensible class is defined by the user of the framework mechanism, by extending the at least one extensible class, thereby defining at least one persistent storage environment;

a persistent container object corresponding to the at least one persistent storage environment and a first set of object methods on the persistent container object to perform a plurality of predetermined functions to implement the persistent storage environment; at least one container configuration object that contains configuration data corresponding to at least one of a plurality of persistent containers and a second set of object methods to return the name of the persistent container and to identify at least one object that contains additional information regarding the persistent storage environment;

at least one container class configuration object that contains configuration data for at least one class in at least one persistent container that defines which classes the at least one persistent container supports;

at least one container store configuration object that contains configuration data that defines a container store that represents an extent of storage that a persistent container has configured to use;

at least one resource object corresponding to at least one transactional resource in the persistent storage environment;

at least one resource configuration object that contains configuration data for the at least one resource object;

at least one resource manager object that contains a list of transactional resources that are available for use;

at least one transaction manager object that manages a transaction by interacting with at least one object corresponding to a transactional resource;

at least one lock manager object that provides control of concurrent accesses to at least one object in the persistent storage environment and a third set of object methods for locking and unlocking at least one object in the persistent storage environment;

at least one cache manager object that manages at least one object in a cache and a fourth set of object methods for retrieving, storing, and deleting the at least one object in the cache;

at least one security manager object that checks for proper authorization to access at least one object in the persistent storage environment;

at least one connection manager object that allocates at least one connection for a transaction;

at least one access mode object that interacts with the at least one lock manager object to determine how at least one object in the persistent storage environment may be accessed;

at least one lock object that determines whether at least one object in the persistent storage environment is in a locked state;

at least one connection object corresponding to a connection that may be allocated by the connection manager object to a transaction;

at least one distributed thread context object that provides a context for at least one distributed thread used in the persistent storage environment;

at least one handle object containing an identifier that uniquely identifies each object in the persistent storage environment;

at least one class configuration object that contains a fully qualified class name corresponding to an object identifier in the persistent storage environment and a fifth set of object methods for determining the class name from the object identifier and for determining the object identifier from the class name; and at least one cached entity instance object containing an in-memory representation of at least one object in the persistent storage environment.

49. An object-oriented framework mechanism that supports persistence of at least one object in an object-oriented system by providing at least one persistent container, the framework mechanism comprising:

at least one core function defined by relationships between a plurality of classes within the framework mechanism, wherein the implementation of the at least one core function is defined by the framework mechanism and cannot be modified by a user of the framework mechanism;

at least one extensible class wherein the implementation of the at least one extensible class is defined by the user of the framework mechanism, by extending the at least one extensible class, thereby defining at least one persistent storage environment;

a persistent container class;

a container configuration class;

a resource class;

a resource manager class;

a transaction manager class;

a lock manager class;

a cache manager class;

a security manager class;

an access mode class;

wherein the persistent container class has a "has" relationship with the cache manager class, the container configuration class, and the lock manager class, and further has a "using" relationship with the resource class, the transaction manager class, the resource manager class, the access mode class, and the security manager class.

50. A method for providing persistence of at least one object in an object-oriented system by providing at least one persistent container using an apparatus having at least one processor and a memory, the memory having an application program that provides an object-oriented programming environment, the method comprising the steps of:

(A) providing in the program an object-oriented framework mechanism that defines a persistent storage system according to extended portions of the framework mechanism that are customized to provide a desired persistent storage environment, the framework mechanism including:

a set of core functions wherein the implementation of the core functions is defined by the framework mechanism and cannot be modified by a user of the framework mechanism; and a set of extensible functions wherein the implementation of the extensible functions is defined by the user of the framework mechanism;

(B) extending the extensible functions in the framework mechanism to define particular classes having predetermined protocols and defining particular object methods that define the persistent storage system, the extensible functions defining the desired persistent storage environment;

(C) generating an executable persistent storage system by integrating together the extensible functions and the core functions; and (D) executing the executable persistent storage system on the apparatus to define the persistent storage environment.

51. The method of claim 50 further including the steps of:

(a) checking a cache to determine if the at least one object is present in the cache;

(b) determining the configuration for a selected persistent container;

(c) allocating a transaction identifier to the at least one object;

(d) allocating a resource corresponding to the transaction identifier to the at least one object;

(e) checking the security of a client object that desires to access the at least one object in the persistent container;

(f) checking the lock state of the at least one object in the persistent container; and (g) fluffing up the at least one object in the persistent container;

(h) storing the fluffed up object in the cache;

(i) returning the fluffed up object to the client object.

52. The method of claim 51 wherein the step of fluffing up the at least one object includes the steps of:

the extensible functions retrieving state data from the persistent container corresponding to the at least one object and creating the at least one object from the state data.

53. A program product comprising:

an object-oriented framework mechanism for providing persistence of at least one object in an object-oriented system by providing at least one persistent container, the framework mechanism including at least one core function defined by relationships between a plurality of classes within the framework mechanism, wherein the implementation of the at least one core function is defined by the framework mechanism and cannot be modified by a user of the framework mechanism, the framework mechanism further including at least one extensible function defined by at least one extensible class, wherein the implementation of the at least one extensible class is defined by the user of the framework mechanism by extending the at least one extensible class, thereby defining a persistent storage environment that governs the operation of the framework mechanism, the framework mechanism comprising:

a persistent container object corresponding to the at least one persistent storage environment and a first set of object methods on the persistent container object to perform a plurality of predetermined functions to implement the persistent storage environment; at least one container configuration object that contains configuration data corresponding to at least one of a plurality of persistent containers and a second set of object methods to return the name of the persistent container and to identify at least one object that contains additional information regarding the persistent storage environment;

at least one container class configuration object that contains configuration data for at least one class in at least one persistent container that defines which classes the at least one persistent container supports;

at least one container store configuration object that contains configuration data that defines a container store that represents an extent of storage that a persistent container has configured to use;

at least one resource object corresponding to at least one transactional resource in the persistent storage environment;

at least one resource configuration object that contains configuration data for the at least one resource object;

at least one resource manager object that contains a list of transactional resources that are available for use;

at least one transaction manager object that manages a transaction by interacting with at least one object corresponding to a transactional resource;

at least one lock manager object that provides control of concurrent accesses to at least one object in the persistent storage environment and a third set of object methods for locking and unlocking at least one object in the persistent storage environment;

at least one cache manager object that manages at least one object in a cache and a fourth set of object methods for retrieving, storing, and deleting the at least one object in the cache;

at least one security manager object that checks for proper authorization to access at least one object in the persistent storage environment;

at least one connection manager object that allocates at least one connection for a transaction;

at least one access mode object that interacts with the at least one lock manager object to determine how at least one object in the persistent storage environment may be accessed;

at least one lock object that determines whether at least one object in the persistent storage environment is in a locked state;

at least one connection object corresponding to a connection that may be allocated by the connection manager object to a transaction;

at least one distributed thread context object that provides a context for at least one distributed thread used in the persistent storage environment;

at least one handle object containing an identifier that uniquely identifies each object in the persistent storage environment;

at least one class configuration object that contains a fully qualified class name corresponding to an object identifier in the persistent storage environment and a fifth set of object methods for determining the class name from the object identifier and for determining the object identifier from the class name;

at least one cached entity instance object containing an in-memory representation of at least one object in the persistent storage environment;

wherein the object-oriented framework mechanism defines a persistent storage system according to extended portions of the framework mechanism that are customized to provide a desired persistent storage environment; and (B) signal bearing media bearing the object-oriented framework mechanism.

54. The program product of claim 53 wherein the signal bearing media comprises recordable media.

55. The program product of claim 53 wherein the signal bearing media comprises transmission media.

* * * * *